US009268945B2

(12) United States Patent
Williams et al.

(10) Patent No.: US 9,268,945 B2
(45) **Date of Patent: *Feb. 23, 2016**

(54) DETECTION OF VULNERABILITIES IN COMPUTER SYSTEMS

(71) Applicant: Contrast Security, LLC, Columbia, MD (US)

(72) Inventors: Jeffrey Williams, Ashton, MD (US); Arshan Dabirsiaghi, Parkville, MD (US)

(73) Assignee: Contrast Security, LLC, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,628

(22) Filed: Feb. 11, 2014

(65) Prior Publication Data

US 2014/0165204 A1 Jun. 12, 2014

Related U.S. Application Data

(63) Continuation-in-part of application No. 13/466,527, filed on May 8, 2012, now Pat. No. 8,844,043, which is a continuation of application No. 12/870,367, filed on Aug. 27, 2010, now Pat. No. 8,458,798.

(60) Provisional application No. 61/315,666, filed on Mar. 19, 2010.

(51) Int. Cl.

| | |
|---|---|
| ***G06F 21/00*** | (2013.01) |
| ***G06F 21/57*** | (2013.01) |
| ***G06F 21/55*** | (2013.01) |

(52) U.S. Cl.

CPC .............. *G06F 21/577* (2013.01); *G06F 21/55* (2013.01)

(58) Field of Classification Search

CPC ............................... G06F 21/577; G06F 21/55
USPC ....................................... 726/25, 22; 713/189
See application file for complete search history.

(56) References Cited

U.S. PATENT DOCUMENTS

| | | | | |
|---|---|---|---|---|
| 5,983,348 | A | 11/1999 | Ji | |
| 7,343,626 | B1 | 3/2008 | Gallagher | |
| 7,509,681 | B2 | 3/2009 | Flowers | |
| 7,603,714 | B2 * | 10/2009 | Johnson et al. | 726/25 |
| 7,788,722 | B1 | 8/2010 | Njemanze | |
| 7,845,006 | B2 * | 11/2010 | Akulavenkatavara et al. | 726/22 |

(Continued)

OTHER PUBLICATIONS

U.S. Non-Final Office Action for U.S. Appl. No. 13/466,527 dated Aug. 15, 2012, 27 pages.

(Continued)

*Primary Examiner* — Sarah Su

(74) *Attorney, Agent, or Firm* — Fish & Richardson P.C.

(57) ABSTRACT

Systems, methods, and apparatus, including computer program products, for detecting a presence of at least one vulnerability in an application. The method is provided that includes modifying instructions of the application to include at least one sensor that is configurable to generate an event indicator, wherein the event indicator includes at least some data associated with the event; storing the event indicator with other stored event indicators generated by the at least one sensor during the execution of the application; analyzing the stored event indicators; detecting a presence of at least one vulnerability in the application based on the analysis of the stored event indicators; and reporting the presence of at least one vulnerability.

20 Claims, 19 Drawing Sheets

(56) References Cited

U.S. PATENT DOCUMENTS

| | | | |
|---|---|---|---|
| 7,860,842 B2 * | 12/2010 | Bronnikov et al. | 707/690 |
| 7,940,654 B2 | 5/2011 | March | |
| 8,127,354 B1 * | 2/2012 | Bettini et al. | 726/22 |
| 8,407,788 B2 | 3/2013 | Kestner | |
| 8,458,798 B2 * | 6/2013 | Williams et al. | 726/25 |
| 8,484,732 B1 | 7/2013 | Chen | |
| 8,839,429 B2 * | 9/2014 | Komaromy et al. | 726/23 |
| 8,839,441 B2 * | 9/2014 | Saxena | G06F 21/577 726/25 |
| 8,844,043 B2 * | 9/2014 | Williams et al. | 726/25 |
| 2002/0184615 A1 | 12/2002 | Sumner | |
| 2003/0115238 A1 * | 6/2003 | O'Connor et al. | 709/100 |
| 2003/0140250 A1 | 7/2003 | Taninaka | |
| 2004/0049699 A1 | 3/2004 | Griffith | |
| 2005/0015760 A1 | 1/2005 | Ivanov | |
| 2006/0195905 A1 | 8/2006 | Fudge | |
| 2007/0143852 A1 * | 6/2007 | Keanini et al. | 726/25 |
| 2007/0209075 A1 | 9/2007 | Coffman | |
| 2007/0214504 A1 | 9/2007 | Milani | |
| 2008/0148399 A1 | 6/2008 | Winkler | |
| 2008/0235801 A1 | 9/2008 | Soderberg | |
| 2008/0295178 A1 | 11/2008 | Beresniewicz | |
| 2009/0106843 A1 | 4/2009 | Kang | |
| 2009/0119776 A1 | 5/2009 | Palnitkar | |
| 2009/0144827 A1 | 6/2009 | Peinado | |
| 2009/0282480 A1 | 11/2009 | Lee | |
| 2010/0050263 A1 * | 2/2010 | Weisman | 726/25 |
| 2010/0100964 A1 * | 4/2010 | Mahaffey et al. | 726/25 |
| 2010/0235647 A1 | 9/2010 | Buer | |
| 2010/0235917 A1 | 9/2010 | Ku | |
| 2010/0281248 A1 * | 11/2010 | Lockhart et al. | 713/150 |
| 2010/0293616 A1 | 11/2010 | Young | |
| 2011/0072517 A1 * | 3/2011 | Tripp | 726/25 |
| 2011/0145918 A1 * | 6/2011 | Jung et al. | 726/22 |
| 2011/0145924 A1 * | 6/2011 | Kolsek | G06F 21/554 726/25 |
| 2011/0162076 A1 | 6/2011 | Song | |
| 2011/0173693 A1 * | 7/2011 | Wysopal | G06F 11/3612 726/19 |
| 2011/0231936 A1 | 9/2011 | Williams | |
| 2012/0042380 A1 | 2/2012 | Kohiyama | |
| 2012/0198553 A1 | 8/2012 | Suginaka | |
| 2012/0222123 A1 | 8/2012 | Williams | |
| 2012/0260344 A1 | 10/2012 | Maor | |
| 2012/0284792 A1 | 11/2012 | Liem | |
| 2014/0165204 A1 | 6/2014 | Williams | |
| 2014/0344936 A1 * | 11/2014 | Thario | 726/25 |
| 2015/0033347 A1 * | 1/2015 | Sulaiman | H04L 63/1433 726/25 |

OTHER PUBLICATIONS

U.S. Non-Final Office Action for U.S. Appl. No. 12/870,367 dated Oct. 3, 2012, 28 pages.

U.S. Final Office Action for U.S. Appl. No. 13/466,527 dated Jan. 2, 2013, 26 pages.

U.S. Notice of Allowance for U.S. Appl. No. 12/870,367 dated Apr. 11, 2013, 14 pages.

U.S. Non-Final Office Action for U.S. Appl. No. 13/466,527 dated Jul. 18, 2013, 30 pages.

U.S. Final Office Action for U.S. Appl. No. 13/466,527 dated Jan. 9, 2014, 32 pages.

U.S. Notice of Allowance for U.S. Appl. No. 13/466,527 dated Jul. 24, 2014, 9 pages.

"Sub: Subtyping" [online], [retrieved Oct. 31, 2013]. Retrieved from the Internet: http://www.cis.upenn.edu/~bcpierce/sf/Sub.html, 24 pages.

"Class LiteXMLElement.tagRange" [online], [retrieved Oct. 31, 2013]. Retrieved from the Internet: http://www.podre.com.br/trabalhos/GraduacaoComputacaoUnisinos/TC/P2PSL/Code/Security/SecurityLayer/jars/jxta-src-2.4.1b/doctimpl/net/jxta/impl/document/LiteXMLElement.tagRange.html, 4 pages.

Rebecca Lui, "Implementation of Procedures in a Database Programming Language," School of Computer Science, McGill University, Montreal, Nov. 1996, Copyright © R. Lui 1996, 146 pages.

* cited by examiner

| | Data | Resource |
|---|---|---|
| 701 | | |
| 702 DATA | "foo!" | **doPost()**-FooServlet.java@134<br>HttpServletRequest.getParameter("foo") |
| 703 TEST | "foo!".equals("bar!")::FALSE | **doPost()**-FooServlet.java@138<br>"foo!".equals("bar!") |
| 704 PROP | foo!bar!test! | **doAction()**-BusinessAction.java@253<br>StringBuilder.append("bar!test!") |
| 705 PROP | foo!test! | **doAction()**-BusinessAction.java@259<br>String.removed(4,7); |
| 706 DATA | foo!test!bad | **setData**-DataBean.java@25<br>StringBuilder.append("bad"); |
| 707 TEST | "foo!test!bad".matches("[a-z]*"))::FALSE | **checkAlpha()** – StringUtils.java@136<br>Pattern.matcher("[a-z]*") |
| 707 TEST | foo%21bar%21bad | **service()** – report/jsp.java@324<br>URLEncoder.encode() |
| 708 USE | <form...value=foo%21rest%21bad/>...orm> | **service()** – report.jsp.java@324<br>PrintWriter.write("<form><input<br>value=foo%21bar%21bad/></form>") |

709
Full context
-Object
-Params
-Return

Full stack trace

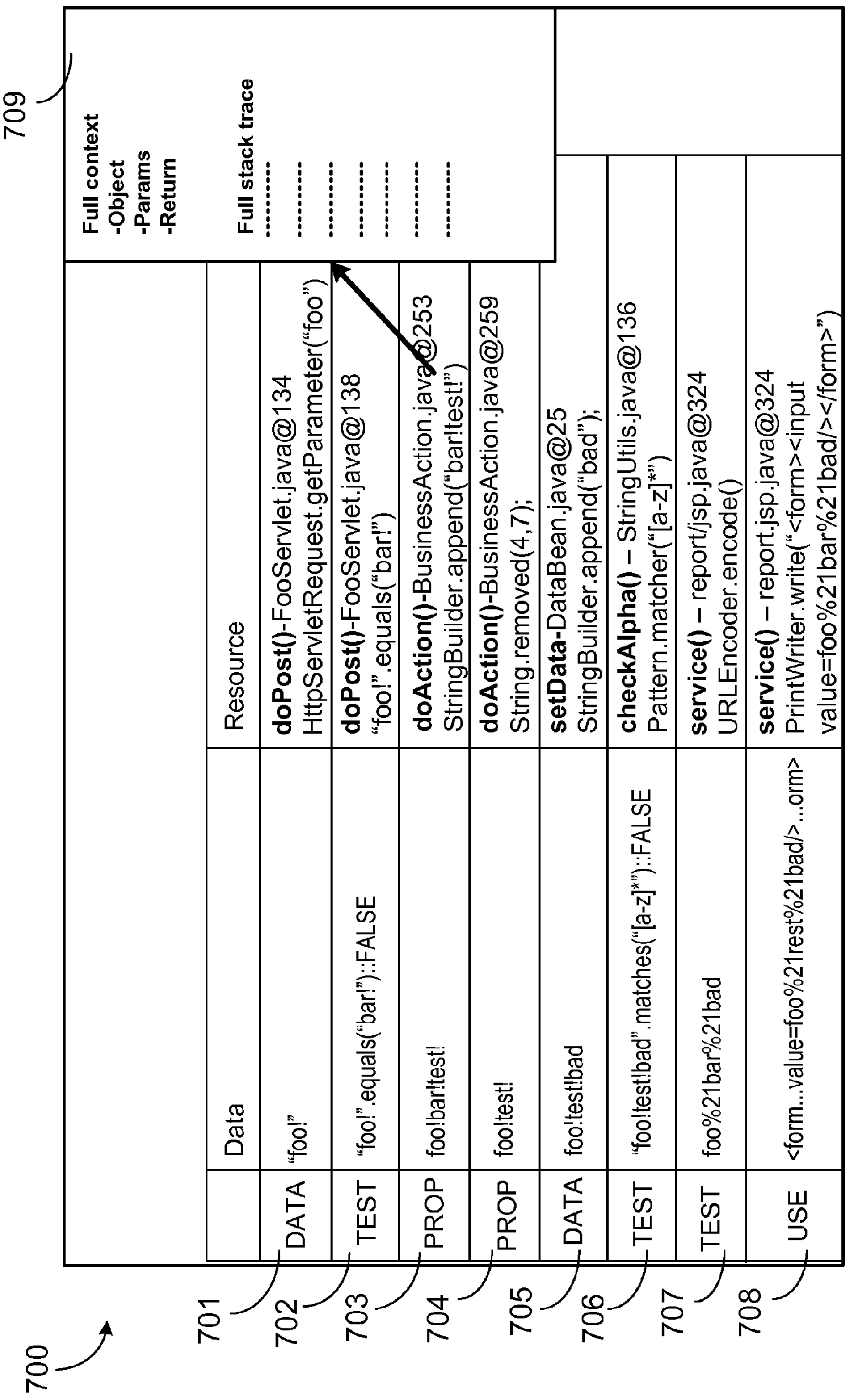

```
<?xml version="1.0" encoding="UTF-8"?>
<trace>
  <!--Trace generated by Aspect Security WhiteCell - http://www.aspectsecurity.com-->
  <timestamp value="Sun Dec 13 00:58:25 EST 2008"/>
  <event type="DATA">
    <context>
      <class type="org.apache.catalina.connector.RequestFacade" value="org.apache.catalina.connector.RequestFacade@ee6ad6"/>
      <method name="getParameterValues" return="[Ljava.lang.String;@a826da"/>
      <parameters types="java.lang.String" values="&quot;HelpFile&quot;"/>
    </context>
    <stack>
      <call level="1" value="org.apache.catalina.connector.RequestFacade.getParameterValues(RequestFacade.java:388)"/>
       ...
    </stack>
  </event>
  <event type="TEST">
    <context>
      <class type="java.util.regex.Pattern" value="\.help"/>
      <method name="matcher" return="java.util.regex.Matcher[pattern=\.help region=0,12 lastmatch=]"/>
      <parameters types="java.lang.CharSequence" values="&quot;foo;bar&cat1{0, 1, 2, 3, 4, 5, 6, 7, 8, 8, 10,11}12*&quot;"/>
    </context>
    <stack>...</stack>
  </event>
  <event type="USE-FileInjection">
    <context>
      <class type="java.io.File" value="C:\Users\jwilliams\Desktop\apache-tomc...apps\WebGoat\lesson_plans\foo;bar&cat1
              {0, 1, 2, 3, 4, 5, 6, 7, 8, 8, 10, 11}0*"/>
      <method name="" return="null"/>
      <parameters types="java.io.File,java.lang.String" values="C:\Users\jwilliams\Desktop\apache-tomcat-6.0.18\
              webapps\WebGoat\lesson_plans,&quot;foo;bar&cat1{0, 1, 2, 3, 4, 5, 6, 7, 8, 8, 10, 11}12*&quot;"/>
    </context>
    <stack>...</stack>
  </event>
</trace>
```

FIG. 8

Edit rule

General
- Rule ID: ☐ Enabled
- Name:
- Category: Authentication ▼
- Vulnerability severity: Critical ▼
- Risk:

Recommendation:

References:

Pattern
- Logic: ○ Positive  Type: ○ Triggered  Connector: ● Choice
- ○ Negative  ○ Scoped  ○ All
- ☐ Events limited to an instance  ○ Sequence
- [Find class]

Events
[+] [✕] [✕]

Method: [Find method]
☐ Include overrides and implementations ☐ Calling object must be tracked
Parameters required to be tracked:
☐ Parameters 1 (java.lang.String)
☐ Parameters 2 (java.io.BufferedReader)

[Save] [Cancel]

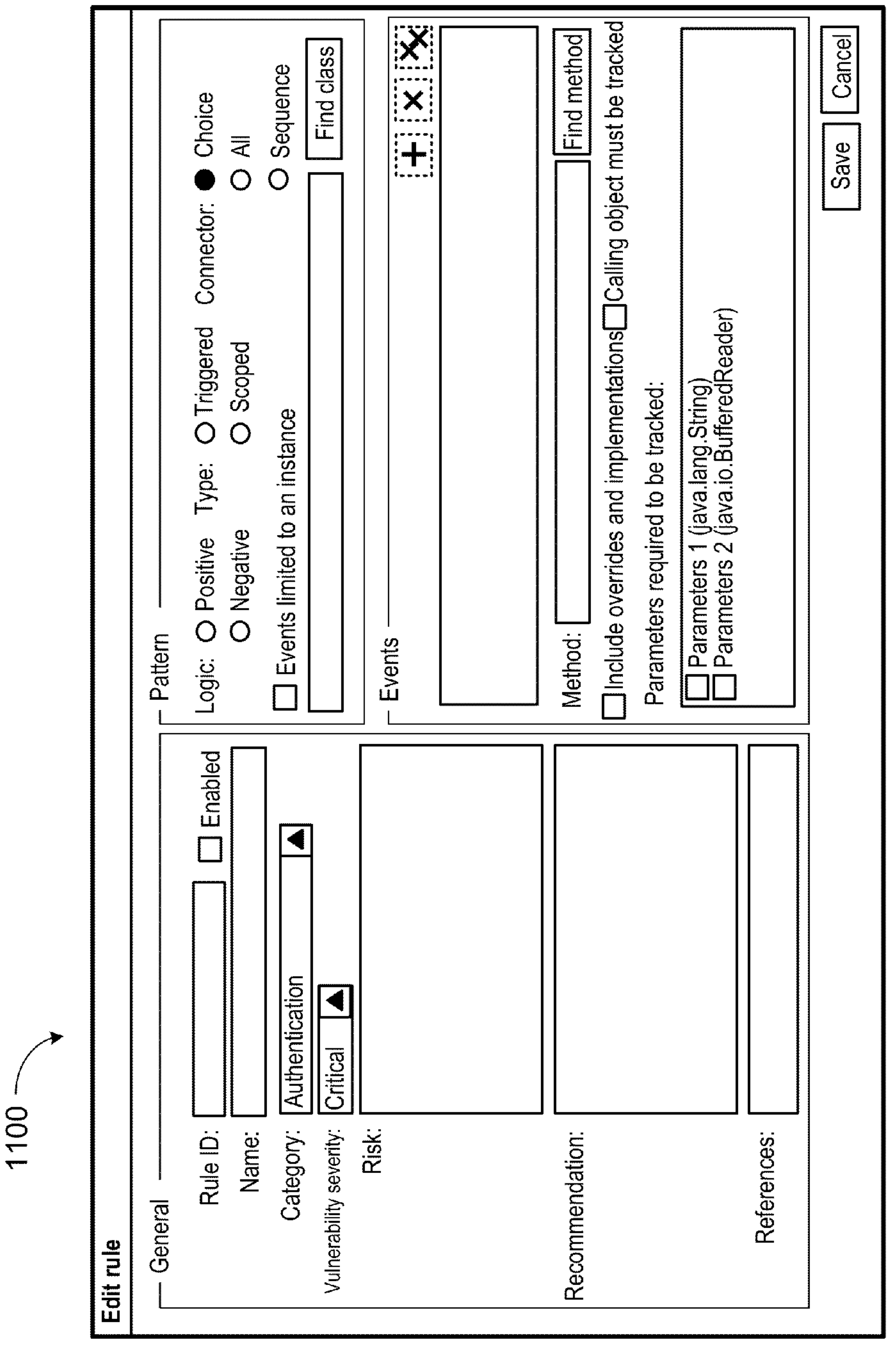

FIG. 11

WhiteCell Vulnerability: Cross-site Scripting (FIHQ-L1SE-POIU-TMNZ-XQFA)

Vulnerability Summary | Events Details | Remediation | HTTP Info | References

Current State: Confirmed

[Confirm] [Reject] [Skip]

The application has a cross-site scripting vulnerability which terminates at JspWriterImpl.line 21. The data is originally pulled from a "request.getParameter()" call on FooServlet.java.line 134. What's shown is a summary of the user-controlled data that is eventually fed into the application's dangerous sink.

1401

| CREATION | foo | doPost() at FooServlet.java@134 |
| PROPAGATION | "foo" | doPost() at FooServlet.java@136 |
| PROPAGATION | he said "foo" | doAction() at ShowFundsAction.java@912 |
| TRIGGER | he said "foo" to her | print() at JspWriterImpl.java@21 |

1400

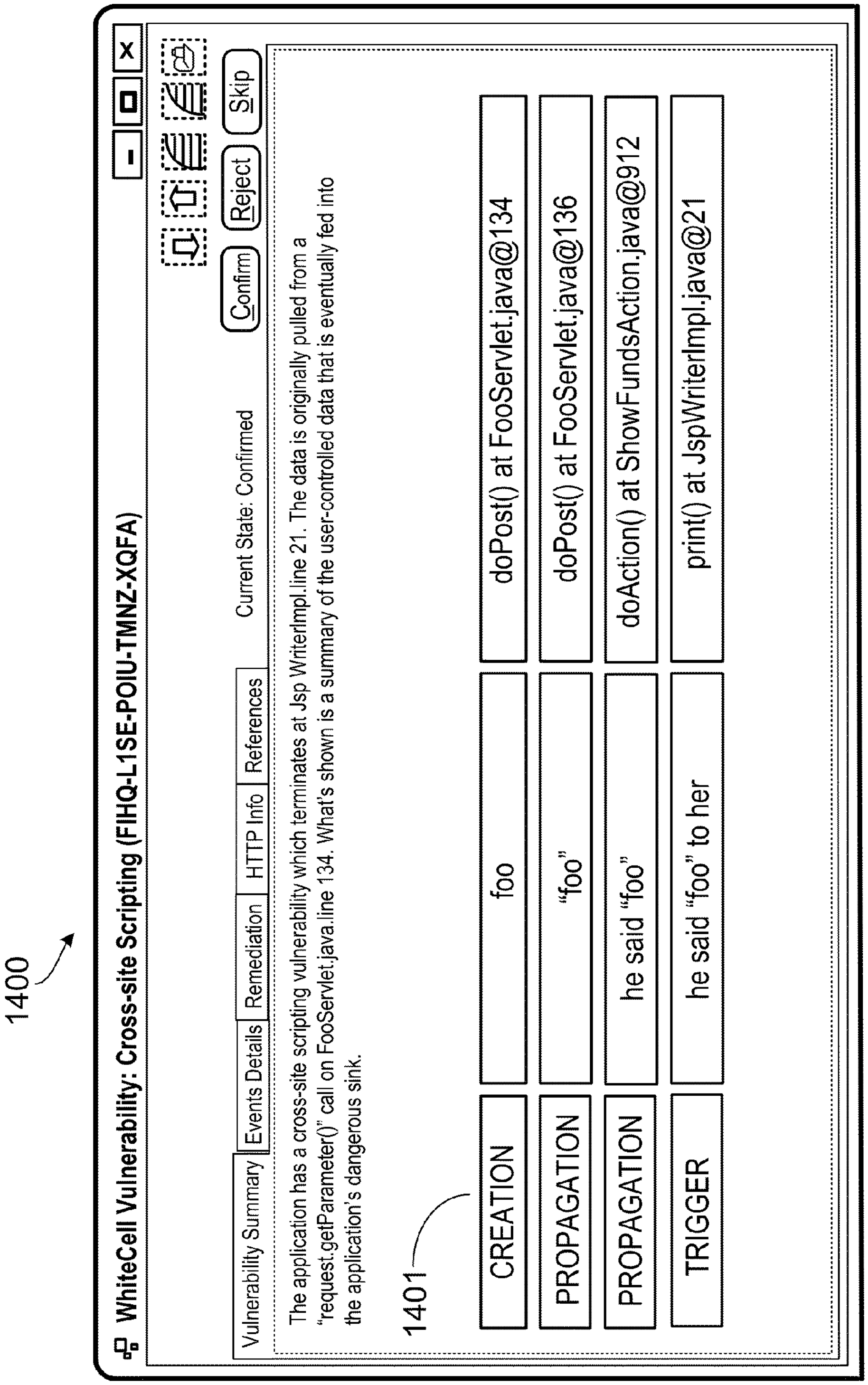

FIG. 14

DETECTION OF VULNERABILITIES IN COMPUTER SYSTEMS

CROSS-REFERENCE TO RELATED APPLICATIONS

This application is a continuation-in-part (and claims the benefit of priority under 35 U.S.C. 119) of U.S. application Ser. No. 13/466,527, filed May 8, 2012, which claims benefit to U.S. application Ser. No. 12/870,367, filed Aug. 27, 2010, now U.S. Pat. No. 8,458,798, issued Jun. 4, 2013, which claims the benefit to U.S. Provisional Application Ser. No. 61/315,666, filed on Mar. 19, 2010. All of these prior applications are incorporated by reference in their entirety.

TECHNICAL FIELD

This description relates to the field of vulnerability detection and testing in computer systems.

BACKGROUND

For years, organizations have struggled to produce applications without vulnerabilities. Application software controls finances, healthcare information, legal records, and even military defenses. Further, application software is growing and interconnecting at an unprecedented rate. This increasing reliance on software combined with rapidly increasing complexity creates significant business risk stemming from the use of software applications. The most efficient way to reduce this risk is to detect and eliminate vulnerabilities as early as possible in the software development process. Therefore, there exists a need for a better method of performing vulnerability detection in software applications and services.

SUMMARY

This specification describes technologies relating to detecting the presence of vulnerabilities in a software application. Application includes all forms of software code executing on computer hardware, including any virtualization hardware technology. An application could be a web application or server running on a web or application server, a mobile application running on a device, a client or server application running on a desktop computer, or any other form of software in a car, refrigerator, airplane, weapon system, or robot.

In general, one aspect of the subject matter described in this specification can be embodied in a method for detecting the presence of at least one vulnerability in an application. The method includes modifying instructions of the application to include at least one sensor that is configurable to generate an event indicator, wherein the event indicator includes at least some data associated with the event. The method further includes storing the event indicator with the other stored event indicators generated by the at least one sensor during the execution of the application, analyzing the stored event indicators, detecting a presence of at least one vulnerability in the application based on the analysis of the stored event indicators, and reporting the presence of at least one vulnerability. Other implementations of this aspect include corresponding systems, apparatus, computer readable media, and computer program products.

These and other implementations can optionally include one or more of the following features. Instructions of the application can be modified before the execution of the application. Analyzing the stored indicators can further include correlating the stored event indicators. Detecting the presence of at least one vulnerability in the application can be based on the analysis of the stored event indicators further includes generating a trace of events associated with the vulnerability. Reporting the presence of at least one vulnerability can further include reporting the presence of at least one vulnerability based on the generated trace of events associated with the vulnerability. The reported presence of at least one vulnerability can include at least one of the following vulnerabilities: SQL injection, command injection, cross-site scripting, weak cryptography, cross-site request forgery, insecure transport, insecure redirect, parameter tampering, session hijacking, security misconfiguration, weak authentication, broken access control, and weak input validation.

In addition, these and other implementations can optionally include modifying instructions of the application to include at least one sensor based on at least one security rule. The security rule can verify that the application has a code segment that prevents a vulnerability risk. The security rule can also verify that the application does not have a code segment that creates a vulnerability risk. The security rule can include description of a triggering condition that, when satisfied, causes the sensor to generate an indicator of an event. The triggering condition can be satisfied when the application fails to securely authenticate a request or a response. The triggering condition can be satisfied when the application fails to securely authorize a request. The triggering condition can also be satisfied when the application does not securely validate or encode data. The triggering condition can be also satisfied when the application fails to use secure communications during its execution. The triggering condition can be satisfied when the application fails to use secure encryption during its execution. The triggering condition can be satisfied when the application fails to prevent caching of its data.

The details are set forth in the accompanying drawings and the description below. Other features and advantages will be apparent from the description and drawings, and from the claims.

DESCRIPTION OF DRAWINGS

FIG. 7 is an illustration of how the tracking module tracks propagating data through the executing application.

FIG. 8 is a screen-shot of a trace generated by the vulnerability detection system.

FIGS. 10 and 11 are screen-shots illustrating a graphical user interface (GUI) used for configuring policies and rules for the vulnerability detection system.

FIGS. 12-18 are screen-shots illustrating various aspects of a graphical user interface used for reviewing results produced by the vulnerability detection system.

Like reference symbols in the various drawings indicate like elements.

DETAILED DESCRIPTION

Implementations of the present disclosure are generally directed to a method for detecting a presence of at least one vulnerability in a software application. More specifically, implementations of the present disclosure relate to how the instructions of the application are modified to include at least one sensor that is configurable to generate one or more the event indicator, the event indicators are stored and analyzed, and a presence of at least one vulnerability is detected based on the analysis of the stored event indicators. Additionally, the detected vulnerabilities are reported to a user.

Figure 1:
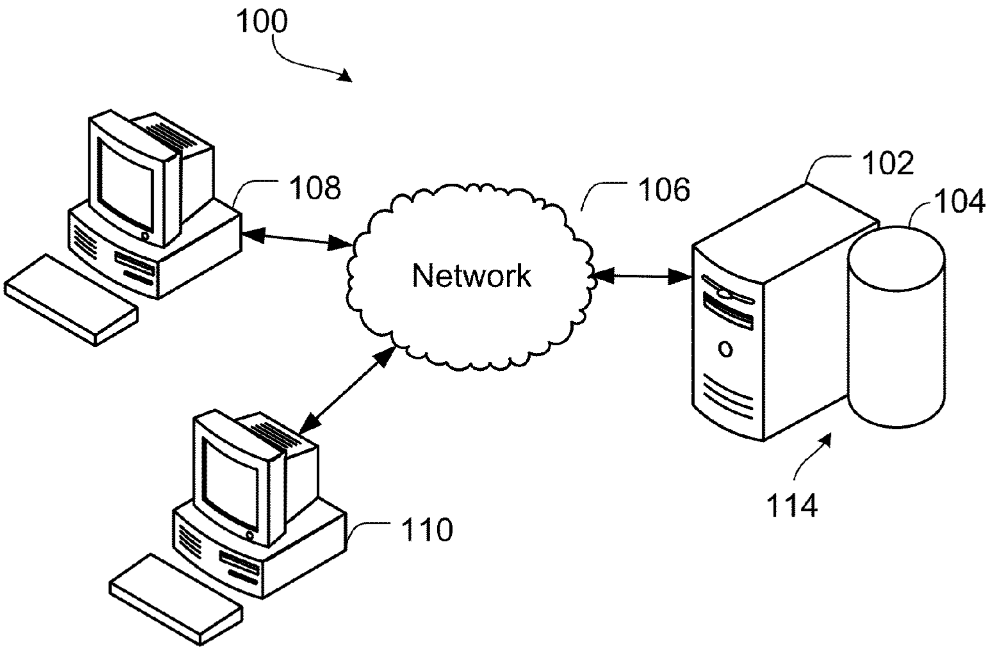
FIG. 1 is a diagram of network architecture of the vulnerability detection system.

Referring now to FIG. 1, a schematic illustration of an example system 100 in accordance with implementations of the present disclosure can include a plurality of clients 108, 110, and a computer system 114. The computer system 114 can include a server 102 and a database 104. In some implementations, the system 100 can represent a client/server system supporting multiple computer systems (e.g., computer system 114) including one or more clients (e.g., clients 108, 110) and/or one or more servers (e.g., server 102) that are connectively coupled for communication with one another over a network 106. In some implementations, the clients (e.g., clients 108, 110) can be directly connected to the one or more servers (e.g., server 102) (without connecting by way of network 106).

The clients 108, 110 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. Each client 108, 110 can access application software on the server 102.

In some implementations, the client devices 108, 110 can communicate wirelessly through a communication interface (not shown), which can include digital signal processing circuitry where necessary. The communication interface can provide for communications under various modes or protocols, such as GSM voice calls, SMS, EMS, or MMS messaging, CDMA, TDMA, PDC, WCDMA, CDMA2000, or GPRS, among others. For example, the communication can occur through a radio-frequency transceiver (not shown). In addition, short-range communication can occur, such as using a Bluetooth, WiFi, or other such transceiver.

In some implementations, the system 100 can be a distributed client/server system that spans one or more networks such as network 106. The system 100 can be a cloud computing system. The network 106 can be a large computer network, such as a local area network (LAN), wide area network (WAN), the Internet, a cellular network, or a combination thereof connecting any number of mobile clients, fixed clients, and servers. In some implementations, each client (e.g., clients 108, 110) can communicate with the server 102 via a virtual private network (VPN), Secure Shell (SSH) tunnel, or other secure network connection. In some implementations, the network 106 can include the Internet, a wireless service network and can include the Public Switched Telephone Network (PSTN). In other implementations, the network 106 can include a corporate network (e.g., an intranet) and one or more wireless access points.

The server 102 can represent various forms of servers including, but not limited to a web server, an application server, a proxy server, a network server, or a server farm. For example, the server 102 can be an application server that executes software accessed by clients 108, 110. In operation, multiple clients (e.g., clients 108, 110) can communicate with the server 102 by way of network 106. In some implementations, a user can invoke applications available on the server 102 in a web browser running on a client (e.g., clients 108, 110). Each application can individually access data from one or more repository resources (e.g., database 104). For example, the server 102 can access database 104. Applications can be provided either by the hosted computing system or from third party systems that are separate from the hosted computer system. Such applications can include services that provide information about locations of various users (as determined, e.g., from GPS on their mobile devices), services that provide news and weather feeds, and other such services. The applications can also include, for example, email and other messaging applications, productivity applications such as spreadsheets and word processors, mapping applications, and mash-ups of various applications that can be presented together in a single presentation.

The application software hosted by server 102 can include various vulnerabilities. For example, the hosted software can include vulnerable data and control flow patterns that enable attackers to force the software to perform various unintended actions. The attacks can be directed from clients 108 or 110 or any other computers. One common vulnerability that attackers attempt to identify is the flow of untrusted data from its entry point, known as a "source," to a vulnerable Application Programming Interface (API), known as a "sink." An example of this problem is called SQL injection, which occurs when untrusted data makes its way through an application and eventually becomes a part of an SQL query. An attacker can manipulate the input data to change the meaning of the SQL query and cause significant harm to the repository resources (e.g., database 104). Other known vulnerabilities, such as command injection, cross-site scripting, weak cryptography, cross-site request forgery, insecure transport, insecure redirect, parameter tampering, session hijacking, security misconfiguration, weak authentication, broken access control, and weak input validation, are also often exploited by attackers and would be apparent to one of ordinary skill in the art.

Figure 2:
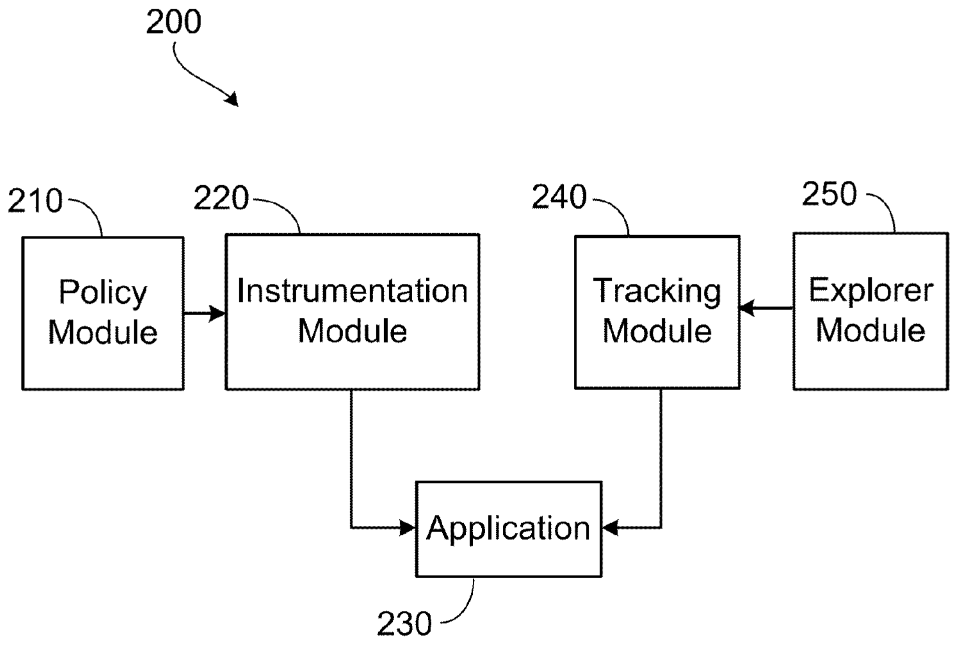
FIG. 2 is a block diagram of the vulnerability detection system.

FIG. 2 is a block diagram of a vulnerability detection system 200 in accordance with implementations of the present disclosure that can detect vulnerabilities in the software. The vulnerability detection system 200 can be implemented as a client/server system, an example of which can include system 100 of FIG. 1. The vulnerability detection system 200 can be implemented using client 108, network 106, and computer system 114 that includes server 102 and database 104.

The vulnerability detection system 200 includes a policy editor module 210, an instrumentation module 220 that is used to instrument a software application 230, a tracking module 240 that collects and analyzes data from the instrumented application 230, and an explorer module 250 that enables an administrative user to browse the results of the vulnerability analysis. The vulnerability detection system 200 or its components can be written in or based on any appropriate computer language including Java, C, C++, Visual Basic, Perl, and others. It will be understood that the vulnerability detection system 200 can reside on a single or multiple computers and can also include an interface for communicating with other computer systems. What follows is a general overview of the vulnerability detection system 200.

In general, the vulnerability detection system 200 operates based on a set of security rules specified with the policy editor module 210. These security rules control the process of vulnerability detection in the application 230 by the vulnerability detection system 200. The security rules have a two-fold purpose. First, the security rules list specific conditions (i.e., events) that, when satisfied, indicate the presence of particular vulnerabilities in the application. Specifically, security rules specify one or more events that when evaluated together correspond to a pattern that indicates a potential vulnerability. Second, the rules identify methods in the application 230 that require checking for vulnerabilities. In particular, each event in the rule identifies one or more methods that need be instrumented by the instrumentation module 220. Multiple rules can be further grouped into policies. In essence, a security policy is a collection of one or more security rules that are designed to identify one or more related vulnerabilities. Security polices can be designed to ensure that security is enforced for particular components. For example, a user may create a policy that checks whether the application properly encodes HTML, sanitizes its SQL queries, performs access control checks, or validates input strings.

The vulnerability detection system 200 inserts software sensors into each of the methods designated by the events in the security rules—a process referred to as "instrumentation." During execution of the application 230, each inserted sensor generates data that is collected and analyzed by the tracking module 240 whenever the instrumented method is invoked. This collected data, referred to as an "event indicator" is essentially a snapshot of data associated with the method instrumented for a particular event. For example, the event indicator can include various information associated with the invoked method, such as the parameters of the method, the copy of the object that invoked the method, the return value of the method, or the trace of the stack at the time the method was called.

The tracking module 240 collects the generated event indicators from the application 230 in a database and analyses the stored indicators for the presence of vulnerabilities. The analysis may be performed during the execution of the application or after the application has completed its execution. In general, the tracking module 240 collects all of the generated event indicators. However, the generation of a particular event indicator does not automatically begin the analysis. The tracking module 240 begins to analyze the collected data only when it encounters a special "trigger" indicator, which tells the tracking module to start the security analysis. Otherwise, the tracking module 240 simply collects the received event indicators for later analysis. When a "trigger" indicator is encountered, the tracking module evaluates the rule associated with that event indicator and checks whether the condition of the event has been satisfied, which may indicate a security violation. In evaluating a particular rule, the tracking module 240 can access the data associated with the triggering indicator, as well as the data associated with any other stored event indicators related to the trigger indicator. For example, if a security rule requires other events to occur for a particular security pattern to be matched, the tracking module 240 will evaluate the stored event indicators for each of the required events before determining whether the entire rule has been satisfied.

When the tracking module 240 determines that a particular rule is violated (i.e., the rule pattern is matched), it generates a trace of the data associated with the violated rule. The trace includes information about the rule, the violated condition, as well events that are associated with the rule. In general, the generated trace signals a possibility of a software vulnerability. That is, when the vulnerability detection system 200 generates a trace for a particular rule, it means that some method in the application 230 satisfied the potentially problematic pattern or the condition of that rule. However, it is ultimately up to the administrative user to determine whether the generated trace indeed identifies a real vulnerability or whether it is a false positive. Therefore, the vulnerability detection system 200 enables the user to browse and analyze the generated traces with the explorer module 250. The explorer module 250 sorts and organizes the collected traces for the administrative user, enabling the user to browse the reported vulnerabilities to determine whether they are valid problems. In cases when the reported vulnerabilities are later determined to be non-problematic, the explorer module 250 allows the user to ignore these types of traces.

The sensors and tracking module can also collect other types of security intelligence from the running application that indicates potential security vulnerabilities. In one configuration, sensors can be created to capture information about the current libraries and other software components in use. Such library information can be used to determine whether each software component is current (for example, not too old) or stale (for example, outdated by too many versions). In addition, such runtime software component intelligence can be used to determine whether the associated license for the software component is appropriate and whether the software component has known vulnerabilities. In another configuration, the vulnerability detection system can also gather information about the software architecture in use in the application. The intelligence on software architecture may include, for example, information about frameworks in use, the composition of application layers, backend connections, and client side technologies in use. The vulnerability detection system can assemble the information on software architecture to generate software security architecture diagrams. The software security architecture diagrams may be presented in an explorer module so that the security architecture diagrams can be analyzed to reveal vulnerabilities and other security critical information of the application. For example, the architecture diagram shows the major software components and how they are connected to each other (also external connections). An analyst may be able to inspect the visualized architecture diagram to determine that a security component is missing, or that the application is connecting to somewhere that the application should not be connecting.

When used with multiple applications, the vulnerability detection system can provide security insight across the entire portfolio of applications or services. The architectural information can allow organizations to identify vulnerabilities that span applications, such as a SQL injection weakness in one application creating access to credit card information stored in a database shared with the first application. Partial vulnerability traces can be assembled by the vulnerability detection system to identify security flaws in applications or services that span multiple systems. Such systems may include physical servers distributed over a communication network (including middleware or proxies). Such systems may also include server processes/threads on one physical machine. Further, the vulnerability detection system can generate an accurate application inventory that includes details of languages, modules, frameworks, lines of code, and other details of the application being monitored. All of the security intelligence generated by the vulnerability detection system may be created in real time and monitored continuously. Generally, the vulnerability may be detected when a front-end application such as a typical web site accesses data using web services (either SOAP or REST) on the backend. In order to identify the flaw, an ability is desired to trace the pattern through the front-end and into the backend. Platform, in this context, may refer to applications running on different application servers.

As explained above, the vulnerability detection system 200 generally operates in two stages. First, the vulnerability detection system 200 instruments the code of the application 230 with sensors, either during or prior to its execution. Second, the vulnerability detection system 200 collects and analyses data from the sensors of the executing application 230 to detect vulnerabilities. A detailed discussion of each stage of the operation of the vulnerability detection system 200 follows.

Figure 3:
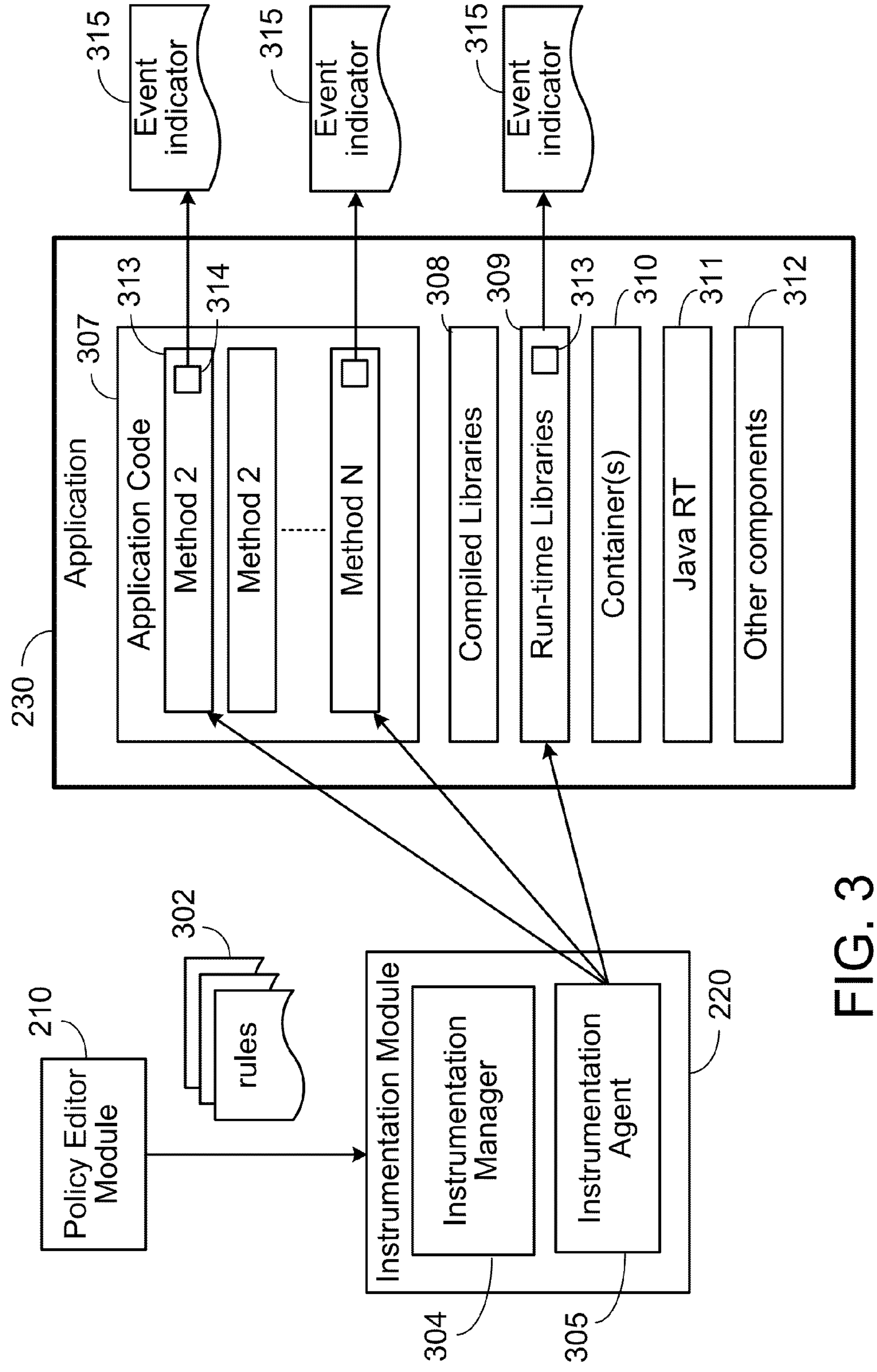
FIG. 3 is block diagram of the vulnerability detection system.

FIG. 3 is a block diagram that illustrates a more detailed view of the vulnerability detection system 200 as it instruments the software application 230. In particular, FIG. 3 is directed to the instrumentation of the application 230 with the help of the policy editor module 210 and the instrumentation module 220.

Software application 230 can include a number of software components. In some implementations, the application 230 includes application code 307, compiled libraries 308, runtime libraries 309, container classes 310, virtual machine 311, and other software components 312. These components can also include methods or subroutines 313, such as shown in more detail for application code 307. A method or a subroutine usually includes a sequence of programming statements to perform an action, a set of input parameters to customize those actions, and possibly a return value. In object-oriented technologies, a method is typically associated either with a class (i.e., a class method or a static method) or with an object (i.e., an instance method). Methods provide a mechanism for accessing and manipulating the encapsulated data stored in an object.

As previously explained, programming flaws in methods or subroutines within the application 230 can render the application 230 vulnerable to attacks and security breaches. To detect these vulnerabilities in the application 230, the vulnerability detection system 200 inserts sensors into the methods of the application 230. The inserted sensors monitor data associated with methods of the application 230 during its execution and enable vulnerability detection system 200 to pinpoint vulnerabilities within the code of the application 230. A sensor is a piece of executable code that helps identify and report data associated with the application's code. A sensor is wrapped in exception handling logic that ensures that the application's execution remains undisturbed.

The process of inserting sensors in the application 230 is referred to as "instrumentation." Vulnerability detection system 200 uses the policy editor module 210 to govern the process of instrumenting the application 230. In particular, with the policy editor module 210, an administrative user can create or edit one or more security rules 302 that specify methods within the application 230 that require instrumentation with one or more sensors. In addition, security rules 302 can also specify a pattern that signals a presence of a security vulnerability, as well as other control information. Security rules 302 can also specify lists of methods that return untrusted data, methods that propagate data from one object to another, and methods that represent security controls. Policy editor module 210 can store the security rules 302 and can also provide a Graphical User Interface (GUI) to an administrative user to enable the user to add new security rules or make changes to the existing security rules. In other implementations, a text processor that permits editing and saving of security rules in some common file format can be used in addition or alternatively to the policy editor module 210. Security rules 302 can be implemented in XML or any other type of declarative or programming language. An exemplarily syntax for specifying security rules is illustrated in Appendix A.

The vulnerability detection system 200 relies on the instrumentation module 220 to insert sensors 314 in the application 230 according to a set of security rules 302 specified with the policy editor module 210. In particular, the instrumentation module 220 includes an instrumentation manager 304 and an instrumentation agent 305. The instrumentation agent 305 processes security rules 302, which specify the methods requiring instrumentation and direct the instrumentation agent 305 to install sensors into the specified methods of the application 230.

Not all methods need to be instrumented. For example, some methods do not carry security risk and so there is little point of instrumenting them, because instrumentation carries additional performance overhead. In contrast, other methods can be prone to frequent security attacks and therefore need to be instrumented to detect possible vulnerabilities. Security rules 302 identify such methods and also specify conditions or patterns that, when triggered, indicate presence of vulnerabilities in those methods.

The instrumentation agent 305 instruments the application 230 by inserting sensors 314 into the methods specified by event objects in security rules 302. In some implementations, the instrumentation agent 305 changes the code of the application 230, but does not change any fields in the instrumented classes or methods. Therefore no data, such as flags, bits, indicators, links, or any other state is added in the instrumented methods or classes. As a result, execution of the application 230 is not adversely affected. In other implementations, the instrumentation agent 305 changes the state associated with methods or classes of the application 230 to facilitate data tracking.

To facilitate rule creation and maintenance, rules may be written to enable instrumentation of multiple methods in one application. By way of example, instrumentation may include parsing the binary codes of an application software as the binary codes are being loaded from a storage device to inject a monitor code. The parsed software code may then be executed by one or more hardware processors. The injection sites may be specific to the particular application software. Instrumentation may follow the rules disclosed herein. For example, some rules may indicate an interface, wildcard, or other way of specifying a collection of methods. In one implementation, a single rule may be written once and then applied to classes at all levels of an inheritance hierarchy. The instrumentation agent 305 may apply the written rules to all the appropriate method implementations across the codebase. In addition, methods to be instrumented may be actually implemented in classes or components other than the classes or components explicitly mentioned within the rule. Hence, the rules may be applied to classes or components not explicit in the rule.

The instrumentation agent 305 can instrument methods dynamically, statically, or by using a hybrid mode of instrumentation. Dynamic instrumentation involves inserting sensors in methods of the application 230 during execution of the application 230 through the use of an API designed for that purpose, such as the Java Instrumentation API. Another type of instrumentation is static instrumentation, in which the code of the application 230 is instrumented with sensors 314 before the application 230 begins to execute. In this case, the instrumentation agent 305 changes the source, object, or executable code of the application 230 to include the instructions or sensors 314 necessary for monitoring. In some implementations, hybrid instrumentation of the application 230 is also possible, such that some methods of the application 230 are instrumented statically, while other methods are instrumented dynamically when the application 230 is executing.

In operation, inserted sensors 314 can generate snapshots of data passed into, through, or out of the methods during execution of the application 230, as well as other data associated with the executing application 230. Each of these snapshots is associated with a particular event specified by a rule and is referred to as an "event indicator." Event indicators 315 can be correlated and analyzed by the vulnerability detection system 200 to identify possible vulnerabilities. Once instrumented, sensors 314 in the application 230 generate event indicators 315 that are passed to the tracking module 240 during execution of the application 230.

The instrumentation module 220 can insert a number of different sensors into the application 230. These sensors generate event indicators whenever an instrumented method is invoked. The tracking module 240 collects all the generated event indicators during the operation of the application 230. Whether any particular event indicator triggers the beginning of the security analysis depends on a type of the sensor that generated that indicator. There exist two general types of sensors—"passive" sensors and "active" sensors.

Passive sensors generate event indicators that are stored by the tracking module 240 for later analysis. These sensors are used to collect various types of data from the executing application 230 that is later used during vulnerability analysis. For example, an "event" sensor simply tells the tracking module 240 to store its event indicators for later use. Event indicators may include any information associated with the instrumented method, such as the parameters of the method, the return value of the method, or the trace of the stack at the time the method was called. Another type of a passive sensor is an "object" sensor. The "object" sensor generates event indicators that include data associated with particular objects, such as objects of methods that receive untrusted data. Yet another type of a sensor is a "propagation" sensor, which is installed into methods that copy data from one object to another. The propagation sensor generates event indicators whenever a particular piece of data is copied between objects and enables the tracking module 240 to follow the changes to that data as it is being propagated through various components of the application 230.

In contrast to "passive" sensors, "active" sensors generate event indicators that, in addition to storing method or object related data, also cause the tracking module 240 to begin the security analysis by evaluating the rules associated with these event indicators. Once the tracking module 240 begins evaluating a rule associated with a particular "active" sensor, it may also access the event indicators previously received from the "passive" sensors. One type of an active sensor is a "trigger" sensor, which generates event indicators that cause the tracking module 240 to begin the vulnerability analysis. Another type of an active sensor is a "scope" sensor that generates an event indicator when the end of a scope of a particular method is reached—that is, when the application exits that method. When the tracking module 240 receives an event indicator from the "scope" sensor, it treats this indicator similarly to a "trigger" indicator and begins the security analysis.

Other important types of active sensors may include monitors for HTTP requests and responses and application server configuration. HTTP request and response sensors capture the HTTP traffic either received at or transmitted from the application server. HTTP response and request sensors may then analyze the captured HTTP traffic for vulnerabilities. For example, examining the HTTP response may allow the some implementations to quickly and accurately identify security issues such as the lack of clickjacking defenses, failure to disable caching of sensitive content, and missing cross-site request forgery tokens. Application server configuration sensors, on the other hand, may access properties files, XML files, APIs, and other sources of configuration data and analyze them for security vulnerabilities, such as the misconfiguration of defenses, improperly protected files, unencrypted passwords, and many others The events from all of these sensors may be combined with data from other sensors when identifying vulnerabilities.

Performance of the sensor installation and operation may be critical to the real-time operation of the vulnerability detection. One technique that can be used to enhance the performance of the instrumentation process is to cache the required code changes as the sensors are installed in the codebase. As long as the policy does not change, the cached changes can be applied rather than reapplying the rules to the entire application each time the application starts. In other words, the process of instrumenting the code when the application starts may be sped up by caching. After the sensors are installed through instrumentation, performance during the operation of the application can be enhanced by reducing the number of times that certain code segment is analyzed within a certain time period. Some level of reanalysis may be desirable to ensure coverage, but repeatedly performing the same analysis may be not. Therefore, a sampling technique can be used to ensure that frequently executed code is not analyzed excessively. A "coverage fingerprint" can be used to identify patterns of input and coverage that are highly predictive of code that has already been analyzed. Specifically, as the binary application codes are executed, the execution is being analyzed. For application binary codes that have been evaluated, turning off the analysis may improve the performance of instrumentation. This mechanism can automatically adjust the level of analysis based on system load and other factors to ensure a minimal performance impact from the vulnerability identification system.

Figure 4:
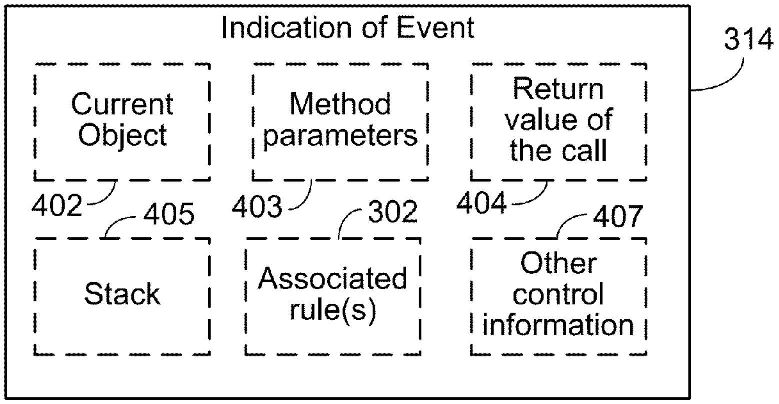
FIG. 4 is a block diagram of an event indicator.
Figure 5:
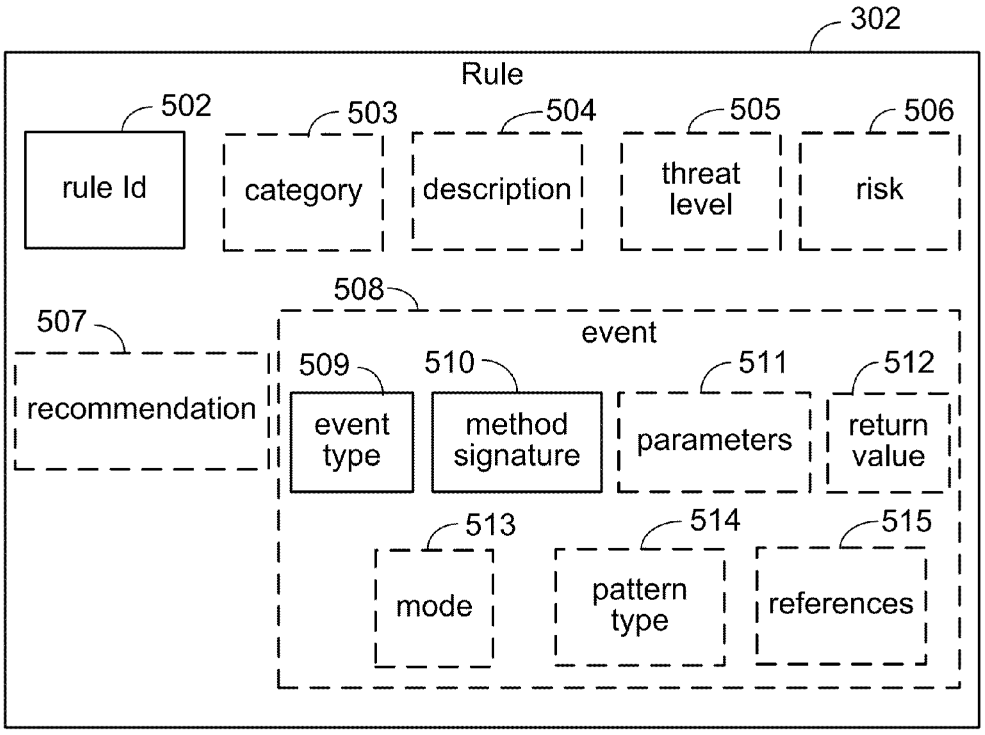
FIG. 5 is a block diagram of a security rule.

FIG. 4 is a block diagram of an example structure of an event indicator 315. The event indicator 315 includes a snapshot of various information associated with data passed into, through, or out of the instrumented methods during execution of the application 230. For example, the event indicator 315 includes the current object field 402, which stores the object that invoked the instrumented method. In addition, the event indicator 315 can include method parameters 403, which are passed to the method when it was invoked. The event indicator 315 can also include a return value of the call 404 from the invoked method. In addition, the event indicator 315 can include a snapshot of the stack 405 at the time when the method was invoked. In addition, the event indicator 315 can include information about the specific security rule that caused the method to be instrumented. The event indicator can either store the entire security rule or just the rule identifier that enables the tracking module 240 to access the contents of the rule from a database. In addition, the event indicator 315 can include other control information 407 related to the event. FIG. 5 is a block diagram of an example structure of a security rule 302. Security rule 302 is a complex data structure that may include various fields. Security rule 302 can include a security rule id field 502, which is a text string or a number that uniquely identifies the security rule among other security rules. For example, security rule id can be set to "security rule#1." Security rule 302 can also include a category field 503, which provides the general category of the vulnerability that the security rule is designed to identify, such as authentication, session management, authorization, validation and encoding, secure communications, encryption, caching, or availability. In addition, security rule 302 can include a description field 504 that provides the general description of the security rule and its purpose, such as "this security rule verifies that the HTTP response contains the proper headers to prevent caching of pages." Furthermore, security rule 302 can include a threat level field 505 and a risk level field 506, which indicate the threat level and the risk level of vulnerability, respectively. For example, threat or risk levels can be set to levels, such as "low," "medium," or "high." Security rule 302 can also include a recommendation field 507 that stores a recommendation to the user for remedying the detected vulnerability. The recommendation can specify the necessary steps required to remove the vulnerability, such as "ensure that all HTTP responses in your application's responses contain an anti-clickjacking header."

In addition, security rule 302 includes one or more event fields 508 that specify events within a security rule. Together, these events comprise a vulnerability pattern that is being detected by the security rule 302. Events can be linked in several different ways using connector operators. For example, connectors can require all the events to occur in a particular order, in any order, or may only require one event from the event list to occur before the pattern is deemed satisfied by the tracking module 240. The connectors may be Boolean logic operators. In addition, each event can indicate a method or methods that need to be instrumented by the instrumentation module 220. For each method, the event can also specify the required values for the object, required method parameters, or the return value that, when matched, will trigger the beginning of vulnerability analysis.

In more detail, each event field 508 can include other sub-fields. In some implementations, the event field 508 can include an event type field 509, which specifies the type of the sensor that will be inserted in the application 230. By default, an event without a type will cause the insertion of an "event" type sensor into the method during instrumentation. A "trigger" event will cause insertion of a trigger sensor in the method. A "scope" event will cause insertion of a "scope" sensor in the method. If the rule indicates that an object needs to be tracked within the method, then an "object" sensor will be inserted in the method during instrumentation. Other types of events are also possible and would be apparent to one of the ordinary skill in the art.

The event field 508 can also include a method signature field 510, which indicates the signature or the name of the method that is being instrumented for this event, such as "javax.servlet.Servlet.service( )" The instrumentation module 220 will instrument all methods that match the pattern listed by the event. The event field 508 can also include parameters field 511 that specifies input parameters passed to the specified method. In addition, the event field 508 can include a return value field 512 that specifies the required value to be returned by the method (e.g., "true".) These input and output parameters, as well as the object values, can be used by the tracking module 240 to determine whether the event matches a vulnerability pattern.

The event field 508 can also include other fields, such as a mode field 513, a pattern type field 514, or a references field 515. The mode field 513 specifies a Boolean operator, such as "and" or "or," which determines whether all or only some of the events are required for the security rule to be triggered. The logic pattern type field 514 specifies whether a logic pattern specified by the security rule is negative or positive. A positive pattern checks whether the application 230 is performing a security operation(s) that helps avoid a vulnerability. A negative pattern checks whether the application 230 fails to perform a particular security operation that creates a vulnerability. The references field 515 includes references to the internet or article sources that provide further information about the vulnerability.

In general, events listed in security rules 302 identify application methods targeted for instrumentation and specify patterns or conditions that, when triggered, indicate presence of vulnerabilities in those methods. The actual pattern detection is performed by the tracking module 240, which evaluates data stored in the event indicators collected from the executing application 230.

Security rules 302 can check for a number of patterns that indicate presence of vulnerabilities, such as command injection, cross-site scripting, weak cryptography, cross-site request forgery, insecure transport, insecure redirect, parameter tampering, session hijacking, security misconfiguration, weak authentication, broken access control, and weak input validation. These patterns fall into categories of authentication, session management, authorization, validation, encoding, secure communications, encryption, caching, and availability.

For instance, a security rule can check whether the application 230 performs proper authentication. In this case, the security rule can verify whether all HTTP requests are authenticated and that all HTTP responses contain anti-clickjacking header. In addition, to check proper session management by the application 230, the security rule can also verify whether logout method actually invalidates HTTP session and whether URL rewriting is not used in the application 230.

In another example, a security rule can be specified to verify whether the application 230 performs proper session management. In this case, the security rule can check whether logout method actually invalidates HTTP session. This security rule can also verify that URL rewriting is not used in the application 230.

In another example, a security rule can check whether the application 230 performs proper authorization of incoming requests. This would happen if the application 230 forwards or redirects HTTP requests using untrusted data.

In yet another example, a security rule can verify whether the application 230 does not securely validate data. For example, this would happen if more than GET and POST HTTP requests were accepted by the application 230. Alternatively, this can happen if untrusted data is used in an HTTP header. Such security rule can also verify that file paths containing untrusted data are not accessed.

A security rule can also be specified to verify whether the application 230 performs proper encoding. For example, security rule 302 can ensure that untrusted data is not used in generated HTML pages or in commands sent to the operating system by the application 230. This security rule can also check whether any untrusted data is used in dynamic database queries or in a reflection API.

In addition, a security rule can check whether the application 230 communicates securely. For example, such security rule can verify that 'secure' and 'httponly' flags are set on cookies associated with the application 230. The security rule can also verify that connection to database uses transport layer security.

In another example, a security rule can check whether the application 230 performs proper encryption. This could be checked by verifying that that only strong cryptographic algorithms, strong hash algorithms, and strong random numbers are used by the application 230. The security rule can also verify that sensitive information is encrypted before storage.

In yet another example, a security rule can be specified to check whether the application 230 does not allow caching by verifying that HTTP responses contain proper headers that prevent caching of pages. A security rule can also be written to check whether the application 230 provides secure availability by verifying that untrusted stream doesn't use readLine( ) method.

While the foregoing is directed to examples of specific security rules, other security rules may be devised without departing from the basic scope thereof. It will be apparent to one skilled in the art that security rules 302 may be written to detect any type of security vulnerability in the application 230.

Some rules may be dynamically generated before the application is run or during execution of the application. In one implementation, the vulnerability detection system may automatically analyze the application code and may recognize a coding pattern, use of certain methods, or other indicators that indicate that a particular method or function represents a security control. The vulnerability detection may yield advisory output to alert a human operator to take note of coding patterns that may yield results unintended by the software application. This analysis might involve invoking the method with a variety of parameters and evaluating the result to determine the type of security control involved. This control is then added to the policy as a rule along with any properties of the control. For example, a validation or encoding method might be added as a rule. The rule may specify a "tag" to signal the effect of the control on data passing through it, such as "html-encoder." The "behavior of the control" may refer to the effect that executing that method has on any traces. One example is given—adding the "html-encoder" tag. But the control behavior might be to "authenticate" or "encrypt" or other security-relevant actions. These security control rules may enhance the detectability and accuracy of vulnerability traces and other security intelligence by providing more details about the code being monitored.

Some implementations may invoke methods with sample data to determine the security relevant behavior of the method, such as validation, encryption, encoding, and escaping. By way of illustration, some implementations may determine if a method is an encoder, validator, encryption, and many other security controls. This code behavior can then be captured in the form of a rule that enhances vulnerability and intelligence gathering. Once the code behavior is known, the execution traces that need to be analyzed may also be known. The knowledge may give rise to improved security architecture diagrams and more accurate vulnerability analysis. Generally, once the location of the security methods becomes known, better security architecture diagrams may be drawn. Accuracies about vulnerabilities analysis may also be improved now that knowledge of which traces go through defenses becomes available.

In another implementation, the vulnerability detection system can dynamically add sensors to an application based on the runtime behavior of the application being monitored. Adaptive instrumentation is instrumentation that is performed dynamically for methods that are not known to require a sensor during application startup. A variety of runtime conditions detected by the invention might trigger the further instrumentation of methods. For example, rather than instrumenting all the methods that fetch data from a database, regardless of whether they produce trusted or untrusted data, the invention can use runtime information to select only those methods likely to produce untrusted data for instrumentation. For example, in one possible implementation, when the invention detects that untrusted data is passed to a "setData( )" method that stores data in a datastore, the invention will instrument the corresponding "getData( )" method to ensure the untrusted data is tracked even though the datastore may be a separate system. Adaptive instrumentation thereby avoids a common source of false positives by ensuring that only necessary methods are instrumented.

Figure 6:
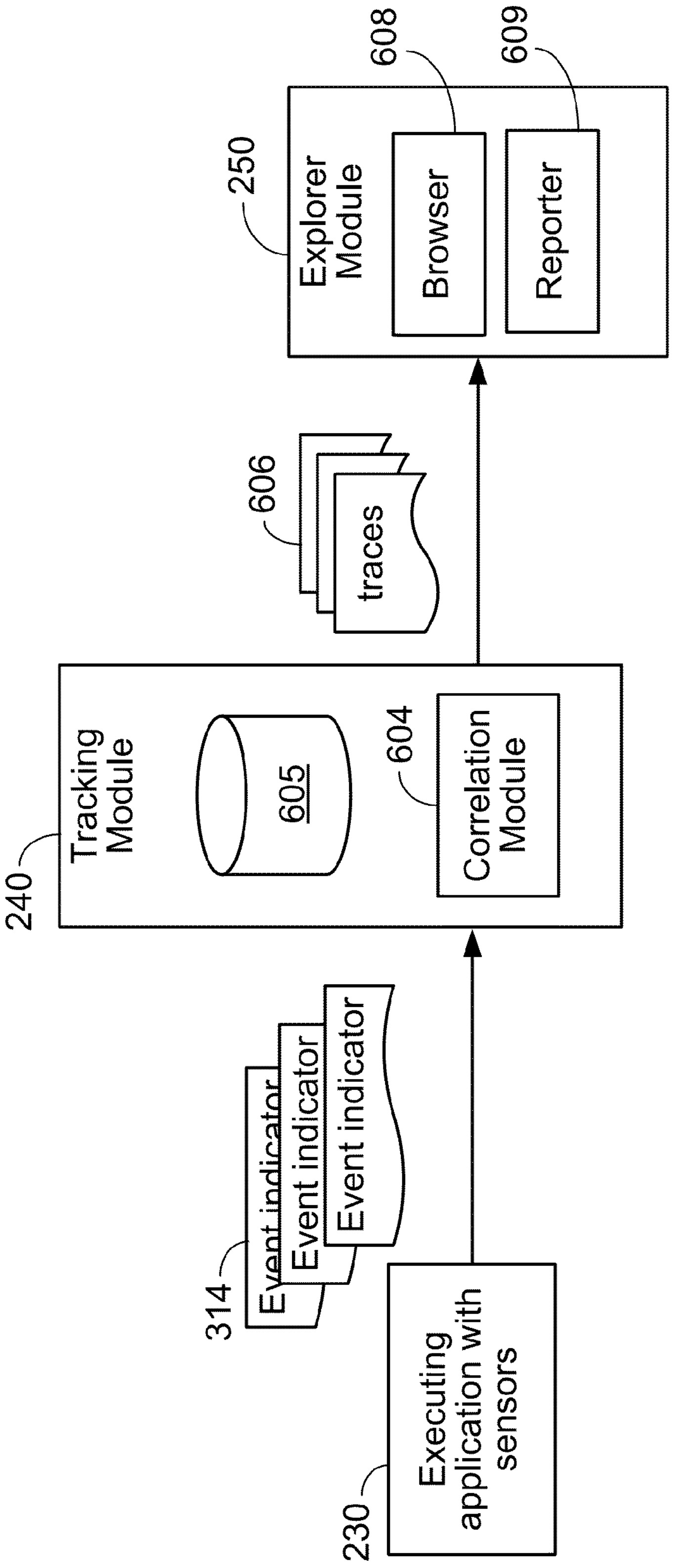
FIG. 6 is a block diagram of the vulnerability detection system.

Now referring to FIG. 6, the second stage of the operation of the vulnerability detection system 200 is discussed. Specifically, FIG. 6 is a block diagram that illustrates how the event indicators are generated, collected, analyzed, and reported by the vulnerability detection system 200.

As explained with respect to FIG. 3, when the instrumented application 230 executes, sensors installed in the application 230 generate event indicators 315 whenever an instrumented method is invoked. Once generated, event indicators 315 are passed to the tracking module 240, which stores the received indicators in database 605 for further analysis using the correlation module 604. In some implementations, database 605 is a weak reference database that tracks objects only until they are garbage-collected. Using a weak reference scheme ensures that data is not tracked for longer than necessary to complete its work, which conserves system resources and prevents memory leaks.

The tracking module 240 tracks data objects and/or event indicators associated with data flows for these data objects. For example, an HTTP request parameter is considered untrusted data and the event indicator that is associated with it would be tracked by tracking module 240, together with the HTTP request. The event indicators that are related to control flow or scope can also be tracked, but because there is no associated data with these the event indicators, these types of events can be tracked using the current thread of execution as the key.

By default, the tracking module 240 can collect all of the event indicators during the execution of the application 230. However, the tracking module 240 begins to analyze the collected data only when it encounters special "trigger" indicators, which tells the tracking module to start the analysis of the collected data for the specified patterns. In particular, when an indicator for a "trigger" event is encountered, the tracking module 240 evaluates the rule associated with that that event indicator and checks whether the condition of that rule has been satisfied, suggesting a possible vulnerability.

When evaluating a particular rule, the tracking module 240 can access data associated with the "trigger" indicator, as well as data associated with any other stored event indicators. Specifically, the correlation module 604 can perform correlation between stored event indicators. For example, if a rule requires a predetermined sequence of specific events to occur before a particular security pattern is matched, the tracking module 240 will evaluate the stored event indicators for each of the required events to see whether any of them are satisfied before determining whether the entire rule has been satisfied.

In addition, the correlation module 604 can follow an untrusted data path either fully or partially through the application 230 based on the collected and correlated event indicators. Following a full data path refers to monitoring the propagation of data from the time the data enters application 230 to the time it leaves application 230. Following a partial data path refers to monitoring any segment of the full data path within application 230, such as following a data path between two particular components within the application 230. In any event, correlation module 604 may be able to investigate data propagation through the application 230 based on the information gathered from various event indicators. Consequently, correlation module 604 can track data as it enters the application 230 or when it is combined, merged, split, replaced, or copied within the application.

FIG. 7 illustrates an example 700 of how the tracking module 240 tracks propagating data through the executing application 230. First, an untrusted data "foo!" enters the application through a call to a method HttpServletRequest.getParameter ("foo") in step 701. Because the HttpServletRequest.getParameter method was instrumented with a sensor, the tracking module 240 receives an event indicator when that method is invoked, along with the method parameters. Accordingly, the tracking module 240 detects that untrusted string "foo!" was returned from HttpServletRequest.getParameter ("foo") and begins tracking all subsequent operations on that data within the application 230. Because the string "foo!" is identified as untrusted by a rule, the tracking module 240 tracks the propagation of this string through the application 230. Whenever the application 230 performs an operation with the string "foo!," the tracking module 240 keeps track of these operations. For example, when the application 230 performs a comparison of the untrusted data with word "bar!" in step 702, the tracking module will store the result of comparison. The tracking module 240 will also note that the application 230 performs several propagation events on the untrusted data in steps 703 and 704 by combining or removing data from the tracked string "foo!" and will track the results of these string manipulations. In addition, when the current version of the tracked string "foo!test!" is further appended with untrusted data "bad" in step 705, the tracking module 240 will track both untrusted fragments of the string. Similar tracking operations will be performed in steps 706 and 707. Finally, the untrusted string "foo!test!bad!" is used in a call to a "sink" method that is vulnerable to untrusted data in step 708. The sinks are the triggers in security rules that cause tracking module 240 start analysis of the event indicators. When the sink is invoked with untrusted data, tracking module 240 recognizes this as a completion of a pattern and generates a trace.

In some implementations, when the untrusted data is combined with the ordinary or trusted data (e.g., step 703) to form new data, the tracking module 240 will transfer event indicators related to the untrusted data to the new data. In essence, this transfer creates a new event indicator 709 that is associated with the new data. The new event indicator 709 can include the full context of the method associated with the previous event indicator(s), such as the object invoking the method, parameters passed to the method, return values of the method, a full stack trace. The use of duplicated event indicators allows the tracking module 240 to track various data changes as application data flows through the components of the application 230.

In some implementations, the tracking of many different types of data may be supported. The simplest types of data are "untrusted" and "trusted." For context, untrusted data generally means any data that could contain an attack. Data becomes "trusted" through a validation process in the code. For example, the application could ensure that a zip code is exactly a sequence of 5 digits. However, there are many other types of data that might be interesting to track for security purposes. For example, credit cards are not necessarily untrusted, but it is often necessary to track credit card data wherever it goes within an application. With tags, each data source may produce data tagged with a certain category or label. Transformations and aggregations of data defined in the rules may cause the tags to be combined, overlapped, removed, and merged. Some operations, such as encoding or validation, may cause new tags to be added to data. When triggering conditions are evaluated, the tags may be used as part of the analysis to determine if a vulnerability has been identified. In one implementation, each event in a trace has an associated set of "tagranges" associated. A tagrange may associate a descriptive attribute or "tag" to some portion of a data object being tracked. Descriptive attributes may include the data type, a characteristic of the data, or an operation that has been applied to the data, etc. Data objects may include Strings, buffers, primitive arrays, object arrays, collections, files, streams, and other types of objects. The creation event may inherit certain TagRanges from the source rule, and the TagRanges for subsequent events may be based on additions, modifications, and deletions to the TagRanges associated with previous events for that particular data object. As disclosed herein, tag ranges may be applied to not only "trusted" and "untrusted" data, but also to any type of tags. Hence, rules can include tags as part of their event specification to improve vulnerability and security intelligence detection.

Referring back to FIG. 6, the tracking module 240 evaluates the received event indicators and generates traces when it recognizes a pattern defined by one or more security rules associated with the received event indicator. For example, when a "trigger" event indicator is encountered, the tracking module 240 evaluates a security rule associated with that event indicator. The security rule can be evaluated using the data from the data objects and events associated with the current thread. The data can comprise a stream of the event indicators. The logic of the security rule is applied to the received event indicators to determine whether the specified security rule has been violated.

When the tracking module 240 detects that a particular security rule has been violated, then it generates a trace 606. The generated trace 606 can be stored for later use. The trace 606 can use an XML or some other file format and includes all or some of the event indicators related to the security rule violation.

There is a possibility that the tracking module 240 can produce a large number of duplicate traces that differ only in data values. For example, when the application 230 invokes the same method many times, a sensor installed in that method generates the same event, which is tracked using the same data as a key. As a result, the event indicators from several data flows can be inadvertently grouped together. To solve this problem, tracking module 240 can include instrumentation to create a unique copy of data for each of the event indicators. Having a unique copy ensures that each data flow is tracked separately with its corresponding data.

To view the results of the analysis, the vulnerability detection system 200 can utilize an explorer module 250 to simplify viewing and analysis of traces and vulnerabilites. The explorer module 250 can include a browser module 608 and a reporter module 609. The browser module 608 provides a graphical user interface for viewing collected traces and reported vulnerabilities. The reporter module 609 is used to generate reports about vulnerabilities, which are viewable either through the browser module 608 or as stand-alone documents. The reports can include all methods involved in vulnerability with actual runtime values. Because the vulnerability detection system 200 may generate a number of duplicate traces associated with the same vulnerability, reports can be configured to eliminate duplicate traces associated with the same or similar of vulnerabilities. For example, the vulnerability detection system 200 may allow a user to specify a limit on the number of duplicate traces associated with the same or similar vulnerability. In addition, the reports can evaluate the security testing coverage and provide a user with a recommendation for improving security and removing vulnerabilities in the application 230.

In one implementation, duplicate detection may be based on a combination of details of the vulnerability, optionally including a dynamic vulnerability title, HTTP parameters, and portions of the stack traces for some of the events in the trace. The duplicate detection analysis may classify the new trace as a true duplicate of previous traces or as a potential duplicate. The tracking system may then choose to track all traces reported, discard duplicates, or automatically group duplicates in the user interface so that they may be viewed as a single vulnerability while still allowing individual duplicates to be analyzed if necessary.

The vulnerability detection system can collect coverage data as the application executes, to inform users of which code segment has been analyzed for vulnerabilities and which code segment has not. The information on analysis status for a particular code segment may be vital in determining whether the codebase has been sufficiently analyzed. In one implementation, coverage information can be collected with coverage sensors instrumented into the code that simply track which classes, methods, or lines of code have been executed and therefore analyzed. As an illustration, execution of instrumented binary codes means the underlying binary codes have been analyzed. The coverage calculations can be based on the entire codebase, or can exclude libraries, frameworks, and other common code that is not the direct subject of the security testing.

FIG. 8 is a screen-shot illustrating an example trace 800 generated by the tracking module 240. The trace 800 is similar to the trace 606, discussed with respect to FIG. 6. The trace 800 includes information associated with a vulnerability pattern specified by the rule. The trace 800 includes one or more the event fields 801 associated with event indicators received from the instrumented application 230. An event field 801 can include information about the type of the event, context associated with the event indicator, the method that generated the event indicator as well as data 802 associated with the method. This data 802 can include input parameters, output values, and stack 803. In short, the event field 801 can include all or at least some of the information associated with the event, as described with respect to FIG. 4.

Figure 9:
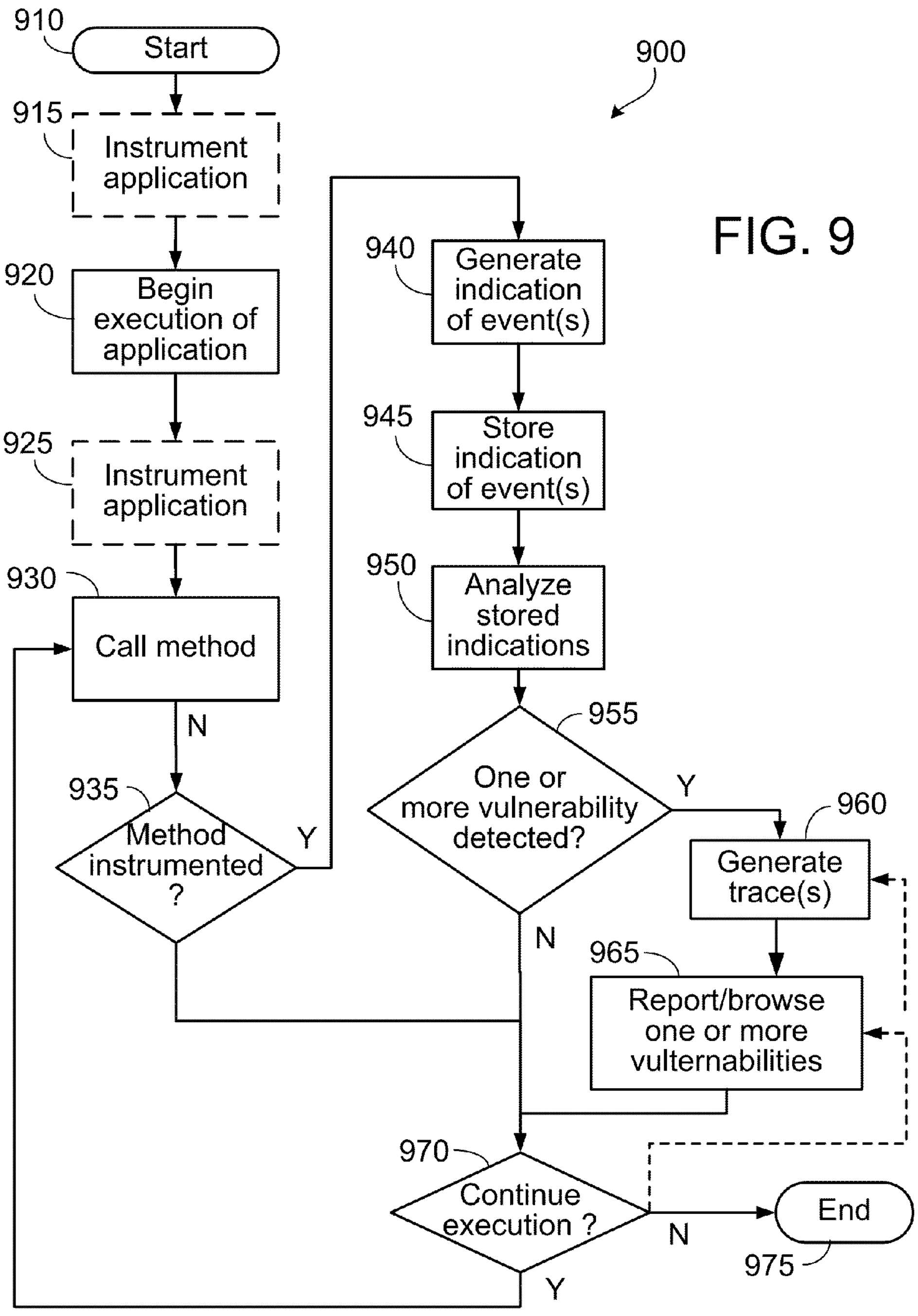
FIG. 9 is a flowchart of steps executed by the vulnerability detection system.

FIG. 9 is a flowchart illustrating example steps 900 that can be executed by vulnerability detection system 200 starting from step 910. In the optional step 915, the application 230 is instrumented with one or more sensors. The vulnerability detection system 200 uses instrumentation module 220 to instrument the application 230 based on the security rules 302. In this step, the application 230 is instrumented statically because it has not begun execution yet. In step 920, the application 230 begins execution. In the optional step 925, the application 230 is instrumented dynamically during its execution. As with static instrumentation, the vulnerability detection system 200 uses the instrumentation module 220 to instrument the application 230 with sensors based on the requirements set forth in security rules 302. In step 930, one of application's 230 methods is invoked. If the called method has been instrumented with one or more sensors (step 935), then the installed sensor(s) in that method generate at least one the event indicator (step 940). If the method is not instrumented, then an even indicator is not generated and the application 230 continues its execution. In step 945, the generated the event indicator is stored with other the event indicators in tracking module 240. In step 950, the tracking module 240 analyzes the stored event indicators and detects any possible vulnerabilities based on the analysis. If at least one vulnerability is detected (step 955), the tracking module 240 generates at least one trace related to the vulnerability (step 960). The explorer module 250 reports the trace to a user and enables the user to browse and analyze the trace, which identifies at least one vulnerability in the application 230 (step 965). Notably, generation of traces and browsing of results can occur while the application 230 is executing or after it has completed execution (975). Therefore, a user can wait until the application 230 has completed its execution to browse the results generated by the vulnerability detection system 200 (970). Alternatively or in addition, a user can browse the results or be alerted about existence of vulnerabilities immediately after vulnerabilities are detected and/or while the application 230 is still executing.

Figure 10:
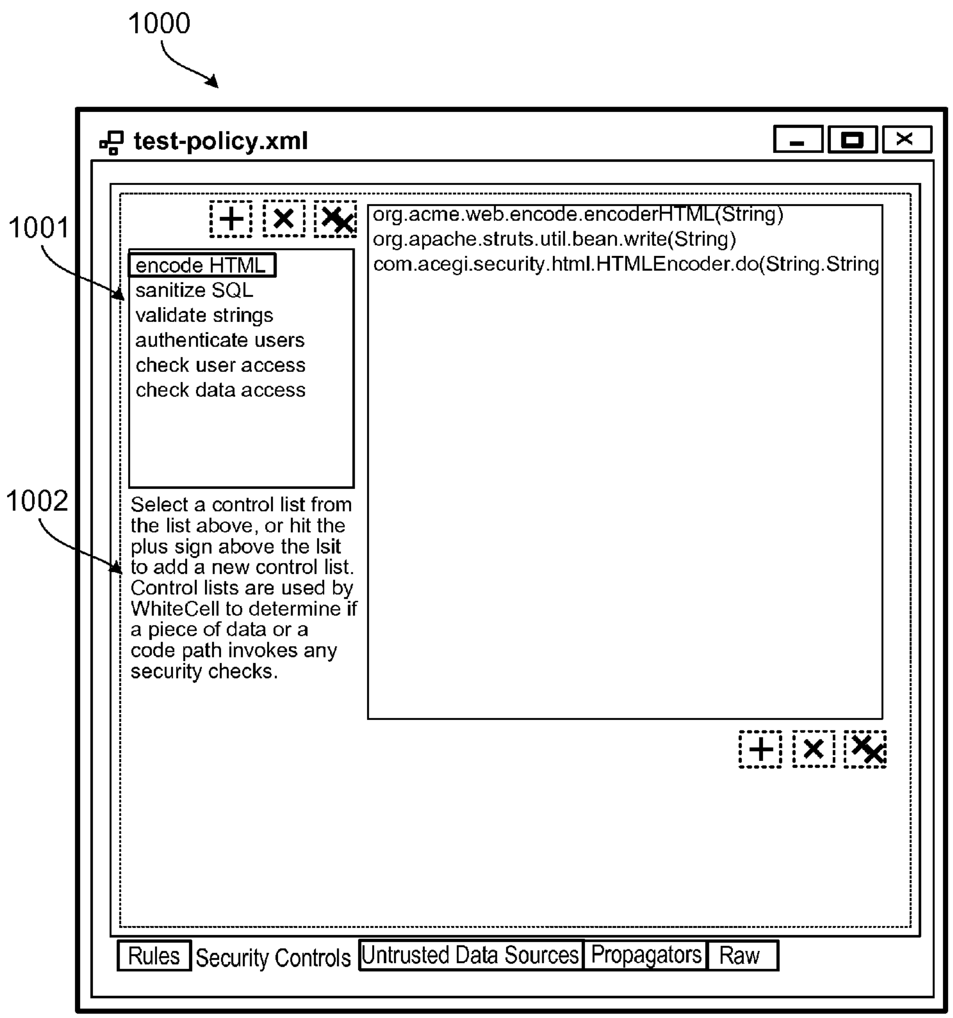

FIGS. 10-17 are screen-shots illustrating various aspects of an administrative interface used for accessing the vulnerability detection system 200. In particular, FIGS. 10 and 11 illustrate various aspects of a user interface used for configuring policies and rules for the vulnerability detection system 200. This interface may be displayed to a user by the policy module 210.

FIG. 10 is a screen-shot illustrating an example Graphical User Interface (GUI) 1000 for an administrative interface used for accessing the vulnerability detection system 200. The GUI 1000 includes various fields that enable an administrative user to specify security policies 1001 for the application 230. Each security policy includes one or more security rules 1002 designed to detecting a particular vulnerability the application 230. In essence, a security policy is a collection of one or more security rules that are designed to identify one or more related vulnerabilities. Security polices can also be designed to ensure that security is enforced for particular components. For example, a user may create a policy that checks whether the application properly encodes HTML, sanitizes its SQL queries, or validates the strings. Other types of policies would be apparent to one of ordinary skill in the art and would depend on the specifics of a particular application.

FIG. 11 is a screen-shot of an example GUI 1100 used for specifying a security rule. The GUI 1100 includes a number of fields used to specify the details of a security rule that identifies a particular vulnerability. The GUI 1100 includes, among others elements, fields that permit the user to specify whether the rule is enabled or disabled, the name of the rule, and the shorthand id of the rule. In addition, the GUI 1100 includes fields that specify the category of the rule, the severity of the vulnerability identified by the rule, the risk associated with the vulnerability, the recommendation for fixing the vulnerability, and references to the internet or article sources that provide more information about the detected vulnerability. Furthermore, the GUI 1100 includes fields that allow a user to specify the logic type of the rule (i.e., positive/negative). A positive rule checks whether the application is performing security operations that are needed to avoid a particular vulnerability. A negative rule checks whether the application fails to perform a particular security operation that creates vulnerability. The GUI 1100 also specifies whether the rule is a triggered rule or a scoped rule. As previously explained, a triggered rule is evaluated with an event indicator from a trigger event is received by the tracking module 240. On the other hand, a scoped rule is evaluated when the end of scope is reached for a specified method. The GUI 1100 also includes a list of events forming a pattern to be matched by the rule, as well as a connector that specifies how the events are evaluated within the rule. For example, if the connector is "choice," then the rule will be violated as long as any one of the events within the rule occurs. On the other hand, if the connector is "all," then the rule will be violated only when all of the events within a rule occur. Finally, if the connector is "sequence," then the rule will be violated only if all of the specified events occur in a particular sequence. In addition, the GUI 1100 can specify the name of a method that needs to be instrumented, including the method's overrides, implementations, and the parameters that need to be tracked. The GUI 1100 may also enable the user to specify whether the calling object of the method must be tracked along with the method. Other types of fields in the GUI 1100 are also possible. One of ordinary skill would recognize that the GUI 1100 is only exemplary and may include fewer or more fields related to the details of security rules, depending on how the rules are configured.

FIGS. 12-18 are screen-shots illustrating various aspects of a user interface used for reviewing results produced by the vulnerability detection system 200. This interface may be displayed to a user by the explorer module 250.

Figure 12:
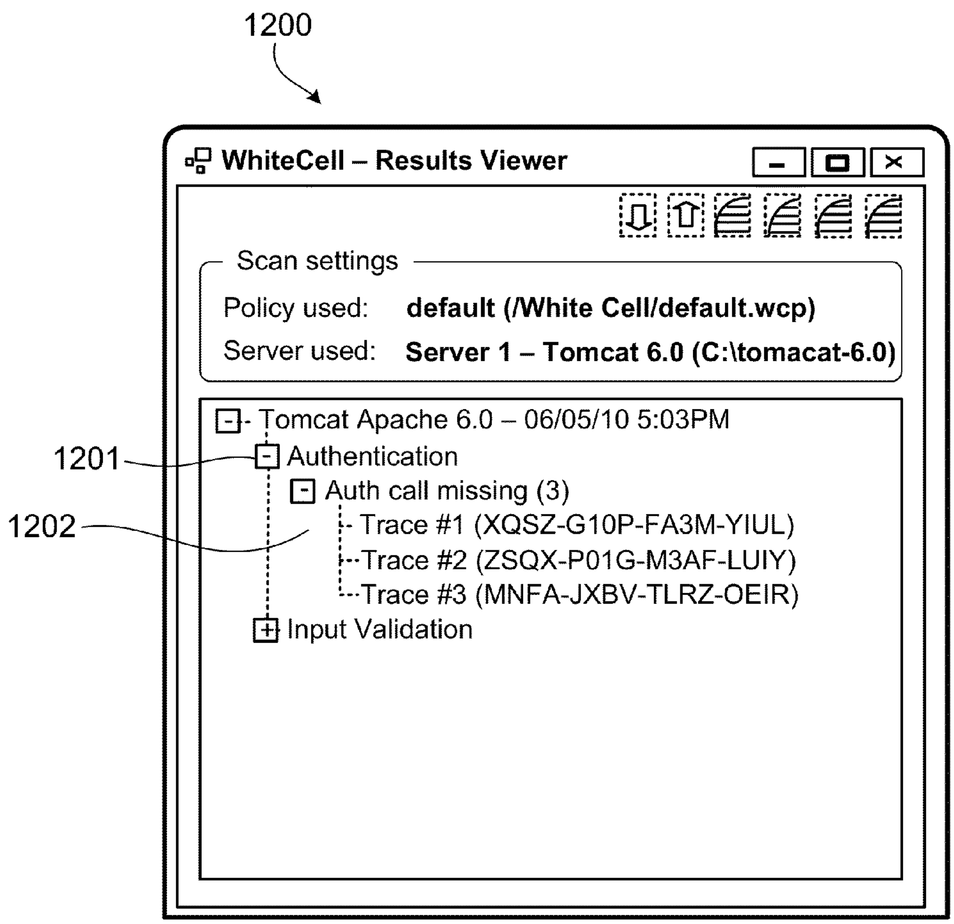

In particular, FIG. 12 is a screen-shot of an example GUI 1200 for browsing traces generated by the tracking module 240. The GUI 1200 enables an administrative user to browse and review traces 1202 generated by the vulnerability detection system 200. The traces may be first grouped by a vulnerability type (e.g., authentication, input validation, etc.) in groups 1201. The traces may be further grouped by a specific vulnerability (e.g., authentication call missing). By clicking on links to individual traces 1202, the user can further drill down to the specific details of each collected trace.

Figure 13:
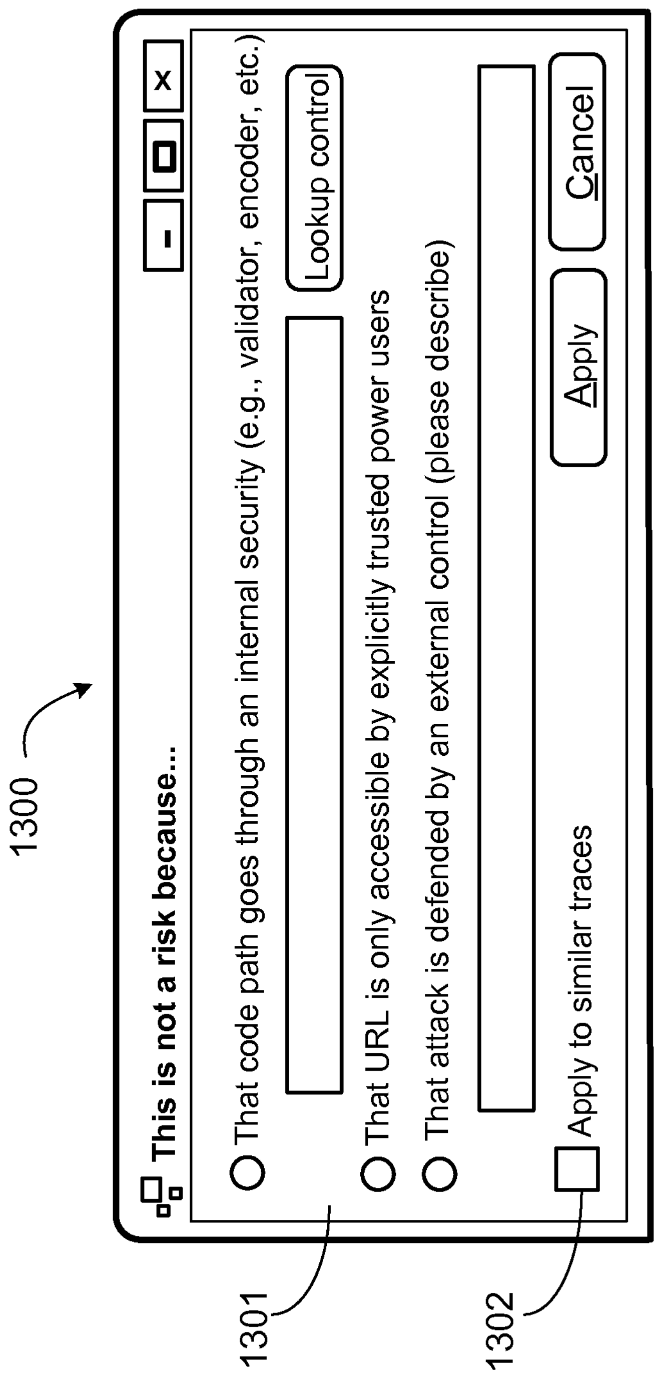

Upon further review, an administrative user may decide that a particular collected trace does not actually indicate a vulnerability. Accordingly, the user may use GUI 1300, which is shown in FIG. 13, to indicate to the vulnerability detection system 200 that a particular trace is not an actual risk. The GUI 1300 includes fields 1301 that permit a user to suppress certain types of traces. For example, the user may specify that the trace does not pose a risk because the code path goes that an internal security control, because a URL is only accessible by explicitly trusted users, because the attack detected by the rule is defended by an external control, or provide any other reason. The user may also be able to apply the same rule characterization to other similar traces using control 1302. Once the trace is characterized as non-threatening, the vulnerability detection system 200 will not report this type of a trace to the user. As a result, the user may be able to reduce the number of traces for review, which may be important in situations where the vulnerability detection system 200 produces a large number of traces, making the review process difficult.

FIG. 14 is a screen-shot of an example GUI 1400 for reviewing an individual trace selected from the GUI 1300. The GUI 1400 includes a summary section 1401 that provides a high-level summary of the detected vulnerability. For example, the summary section 1401 can include a short explanation of the rule's significance. In addition, the summary section 1401 can include an explanation of how the vulnerability is created in the application. For example, the summary section 1401 can include a graphical or textual illustration that identifies propagation of untrusted data from its entry point ("source") to a vulnerable API ("sink"). Of course, the summary section 1401 may include summary information about other detected vulnerabilities, such as command injection, cross-site scripting, weak cryptography, cross-site request forgery, insecure transport, insecure redirect, parameter tampering, session hijacking, security misconfiguration, weak authentication, broken access control, and weak input validation. In addition, the GUI 1400 can enable the user to confirm, reject, or skip each identified vulnerability.

Figure 15:
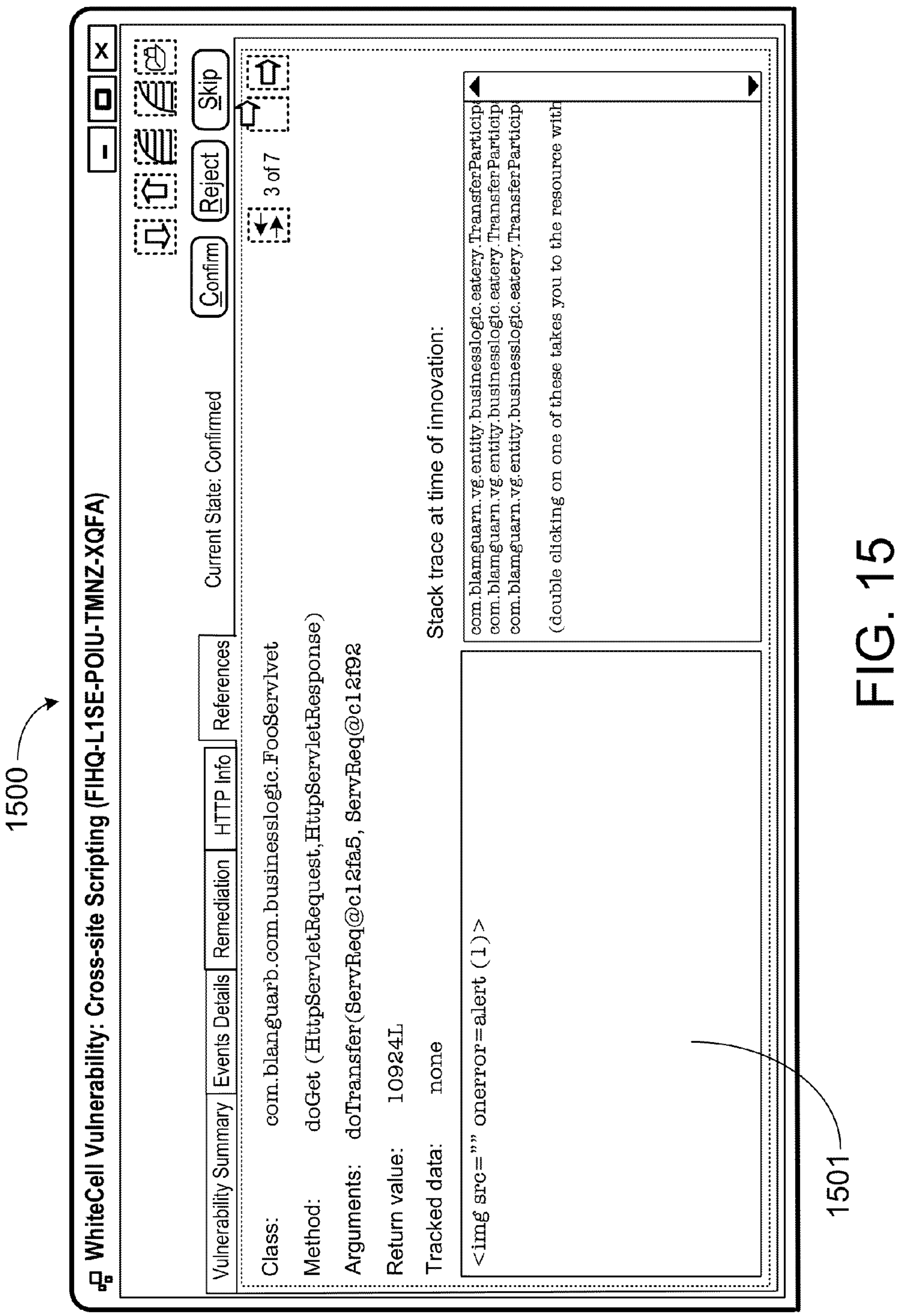

FIG. 15 is a screen-shot of an example GUI 1500 that provides the user with further detail about a detected vulnerability trace that was discussed with respect to FIG. 14. FIG. 15 includes various fields 1501 that provide further detail to a user about the one or more events that triggered within the rule. For example, fields 1501 may include a class and a method associated with the triggered event. In addition, fields 1501 may include the method's arguments, the return value of the method, and the stack trace at the time of the method's invocation. Furthermore, fields 1501 may provide the user with any other information associated with the triggered event, such as information about any tracked data associated with the event.

Figure 16:
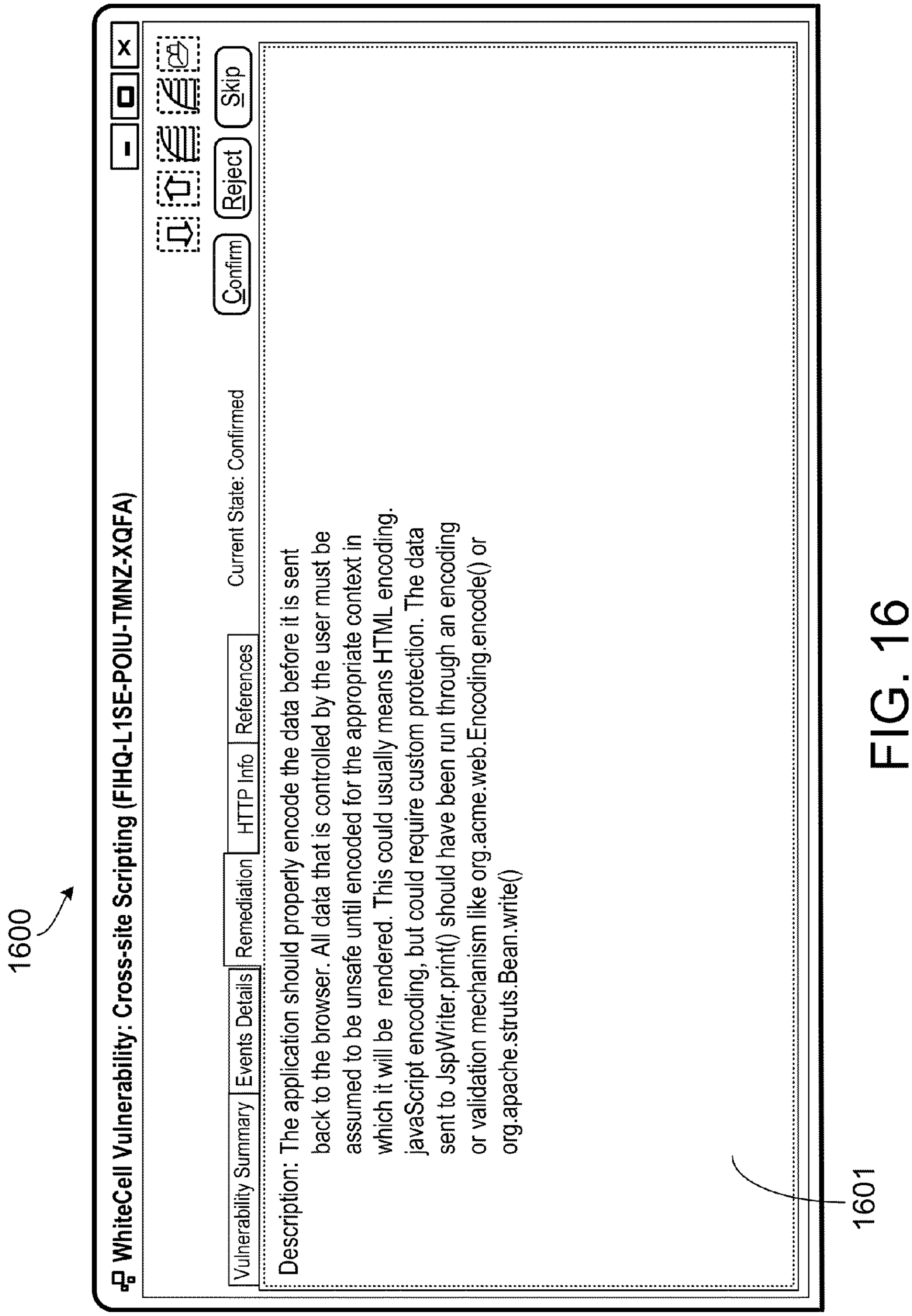

FIG. 16 is a screen-shot of an example GUI 1600 that provides a user with a suggestion for remedying the detected vulnerability. The GUI 1600 includes a description field 1601 provides an in-depth description of the detected vulnerability, as well as a suggestion to the user for fixing the vulnerability in the application. For example, if the vulnerability detection system 200 detects that a component of the application 230 does not properly encode data, the description field 1601 can include a list of suggestions to the user explaining the best ways to encode data within the identified component of the application 230.

The vulnerability detection system can provide remediation guidance to users of the system. In one implementation, the guidance may include written instructions for how to change the code, design, or configuration of the application to improve security. The remediation guidance may include examples of vulnerable and correct code as part of the guidance. This guidance may be generic or automatically customized to show the exact enhancements necessary to remediate the vulnerability. In more advanced implementations, the guidance may include automatic generation of a security rule for an external security device such as a web application firewall. The external security device can help mitigate an attack or the impact of a successful attack. Implementations can also generate remediation guidance that includes corrected code to replace the vulnerable code as detected.

The guidance could also include code snippets extracted from the application itself. Such code snippets may include suspected vulnerable code. The code snippets might be accessed from the file system on the computer running the application. The code snippets may also be decompiled from within the vulnerability detection system. The code snippets can be presented to the user of the detection system in an effort to more accurately describe the vulnerable application behavior. When presented in the right context, the presented snippets are expected to facilitate revisions to the code to mitigate the identified vulnerabilities. The snippets can be generated for all parts of a vulnerability trace, including not only the lines directly related to a particular event, but also the code segments for all the caller methods in the stack leading to the invocation of the particular event.

In some implementations, additional analysis might be performed on the vulnerability trace data in order to generate more specific remediation descriptions. In one implementation, the additional analysis may include analyzing the runtime data captured by the vulnerability detection system to determine the specific context for an injection attack, such as SQL Injection or Cross Site Scripting. In one implementation, this context is the full data surrounding the untrusted data identified in a trace. For example, the context might be the full SQL query, and the analysis would reveal that the untrusted data was surrounded in quotation marks. This information is valuable when determining the appropriate remediation advice. The system may then analyze the data to determine all the nested contexts to decide on the appropriate security defense. For example, the HTML context for a Cross Site Scripting attack might place untrusted data within a quoted HTML attribute, within a javascript block, or in a CSS stylesheet. The set of contexts can be nested, such as, for example, an injection point within a quoted URL, in a Javascript assignment, as part of an onmouseover event, or in an image tag. Contrast may analyze the set of contexts to identify context-sensitive remediation advice, such as an encoding scheme that will prevent attacks against that injection point.

In another implementation, part of the remediation guidance provided for vulnerabilities may include software patches to be applied to the vulnerable software. The softwarepatches may be based on the specific details of the vulnerability identified by some implementations, and might be in source or binary form. The softwarepatches can be pushed through the vulnerability detection system to applications running the vulnerable code. and then applied as the application code is being loaded at runtime. The run-time on-demand mechanism can also be used to apply patches to libraries and components with known vulnerabilities through the vulnerability detection system as disclosed herein.

In another implementation, the vulnerability detection system may automatically identify that previously identified vulnerabilities have been remediated. When the application handles a replay of an HTTP request associated with a previously discovered vulnerability, but the vulnerability is no longer present, some implementations may identify that the vulnerability has been fixed. If the HTTP request is very similar to the original request, the remediation can be detected with a single request. If the HTTP request has differences from the original request, a multitude of such requests might be required to determine remediation.

In another implementation, the vulnerability detection system automatically identifies the appropriate remedy for an identified security vulnerability based on the libraries, architectural frameworks, or other architectural contexts. For example, the detection system might recognize that a particular application is using the Struts application framework (i.e., a standard in developing Web applications), and that a vulnerability exists in the manner in which the Struts application framework is being used by the particular application. Accordingly, the system may provide a Struts-specific fix for the identified vulnerability as a part of the remediation advice. The architectural framework and architectural context may include almost any aspect of the application or service that the inventions other sensors can identify, such as backend connections, security controls, browser technologies, libraries, coding patterns, and platforms. Browser technologies may refer to any software application attempting, through, for example, the hyper text transfer protocol (HTTP) or its equivalent, to access data maintained at a server. Security controls may refer to defenses against attacks, such as encryption, access control, or authentication. Platform may generally refer to the software stack enabling the application to run, including operating system, web server, application server, application framework, and libraries.

Figure 17:
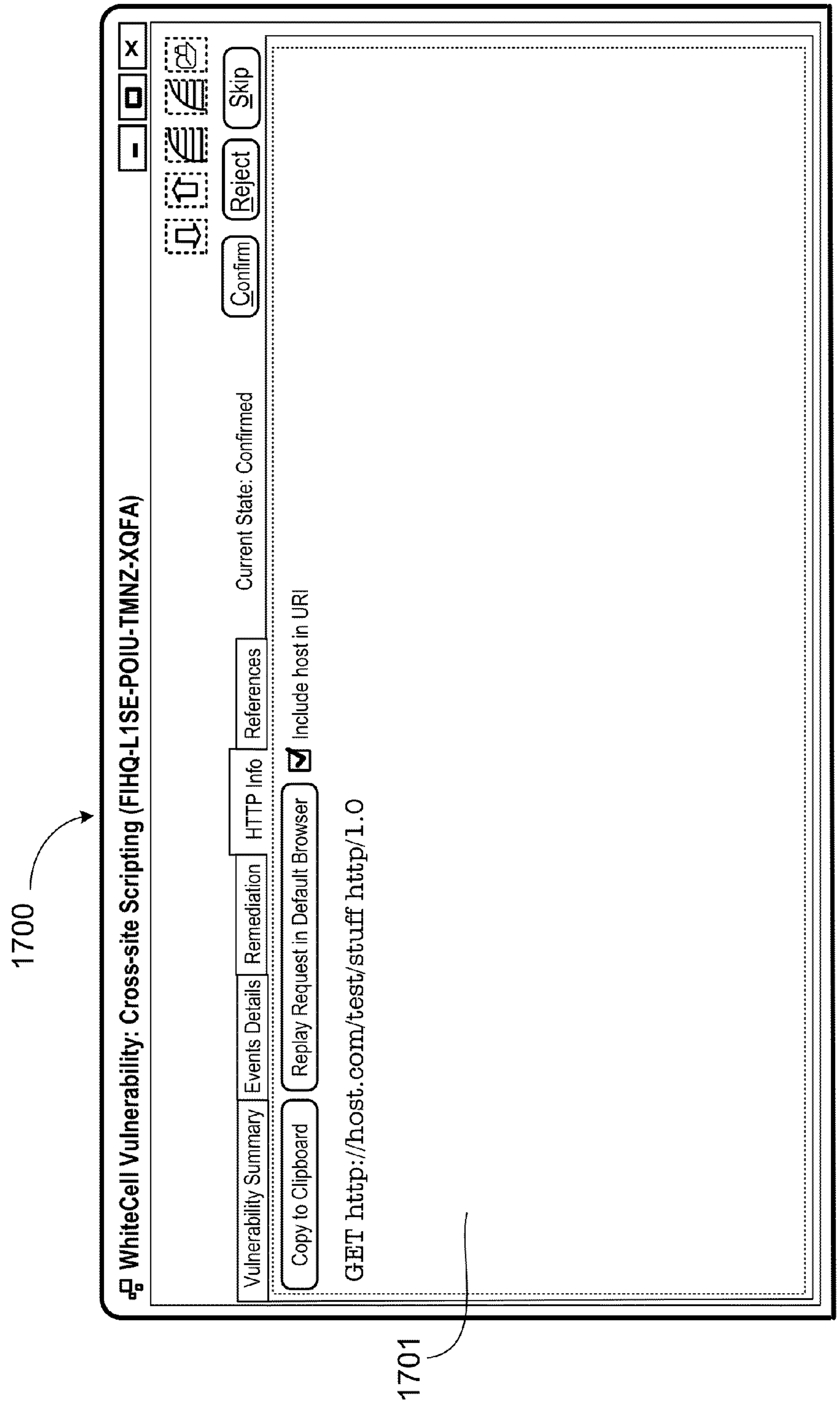

FIG. 17 is a screen shot of an example GUI 1700 that provides a user with further information about the application call that causes the vulnerability. The GUI 1700 can include an information field 1701 that lists application calls leading to the detected vulnerability. For example, the information field 1701 can include a list of vulnerable HTTP commands (e.g., GET, POST, etc), along with the parameters of those commands.

Figure 18:
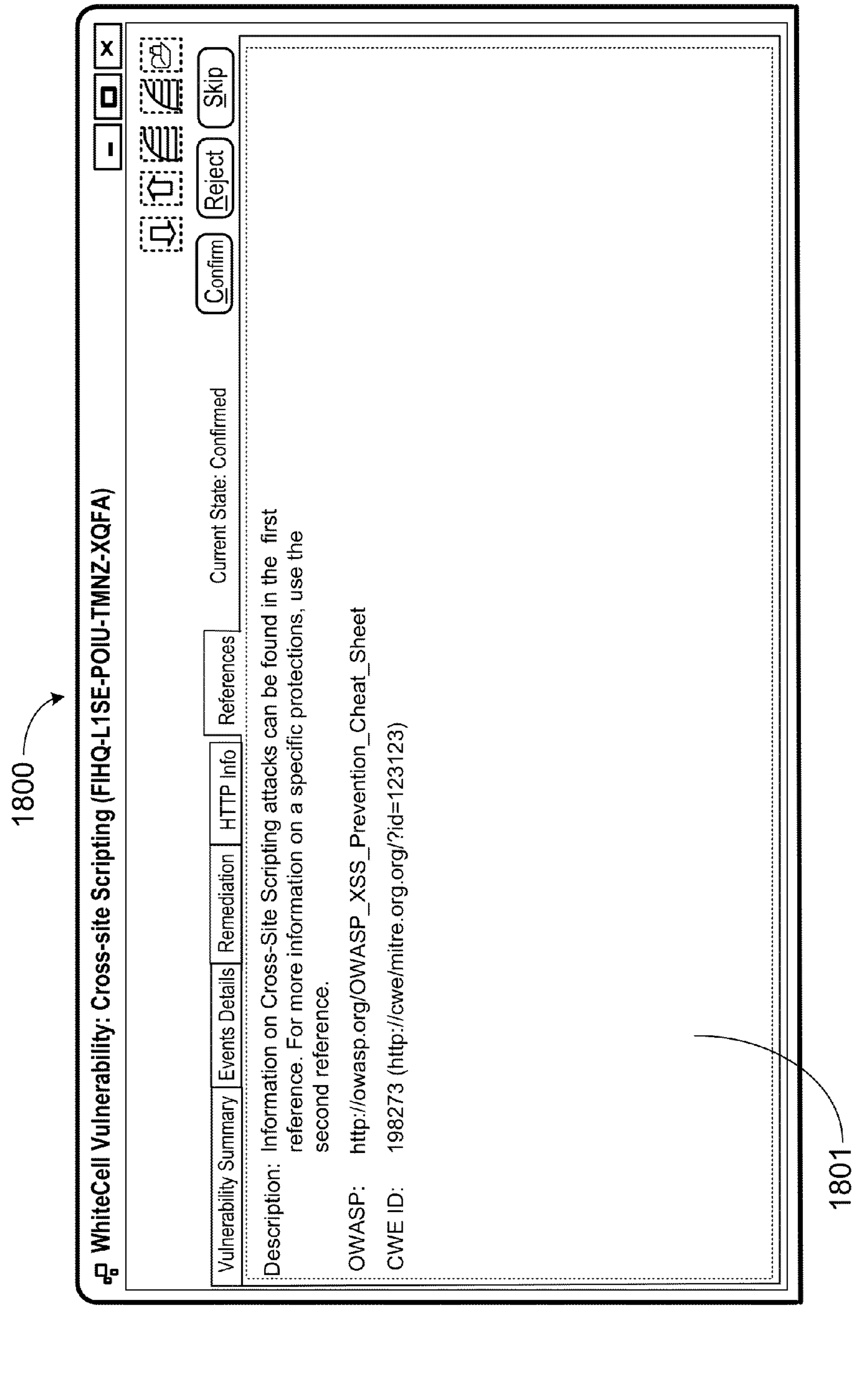

FIG. 18 is a screen-shot of an example GUI 1800 that provides a user with further information or references about the detected vulnerability. The GUI 1800 includes a field 1801 that lists various industry references that may enable the user to gather more information about the detected vulnerability. For example, the field 1801 can include links to online standards, manuals, reference materials, or any other information that will help the user obtain further information about the vulnerability.

One of ordinary skill would, of course, recognize that interfaces in FIGS. 11-18 are only exemplary and may each include fewer or more fields related to the details of security rules or detected vulnerabilities, depending on the specific details of rules or detected vulnerabilities.

Figure 19:
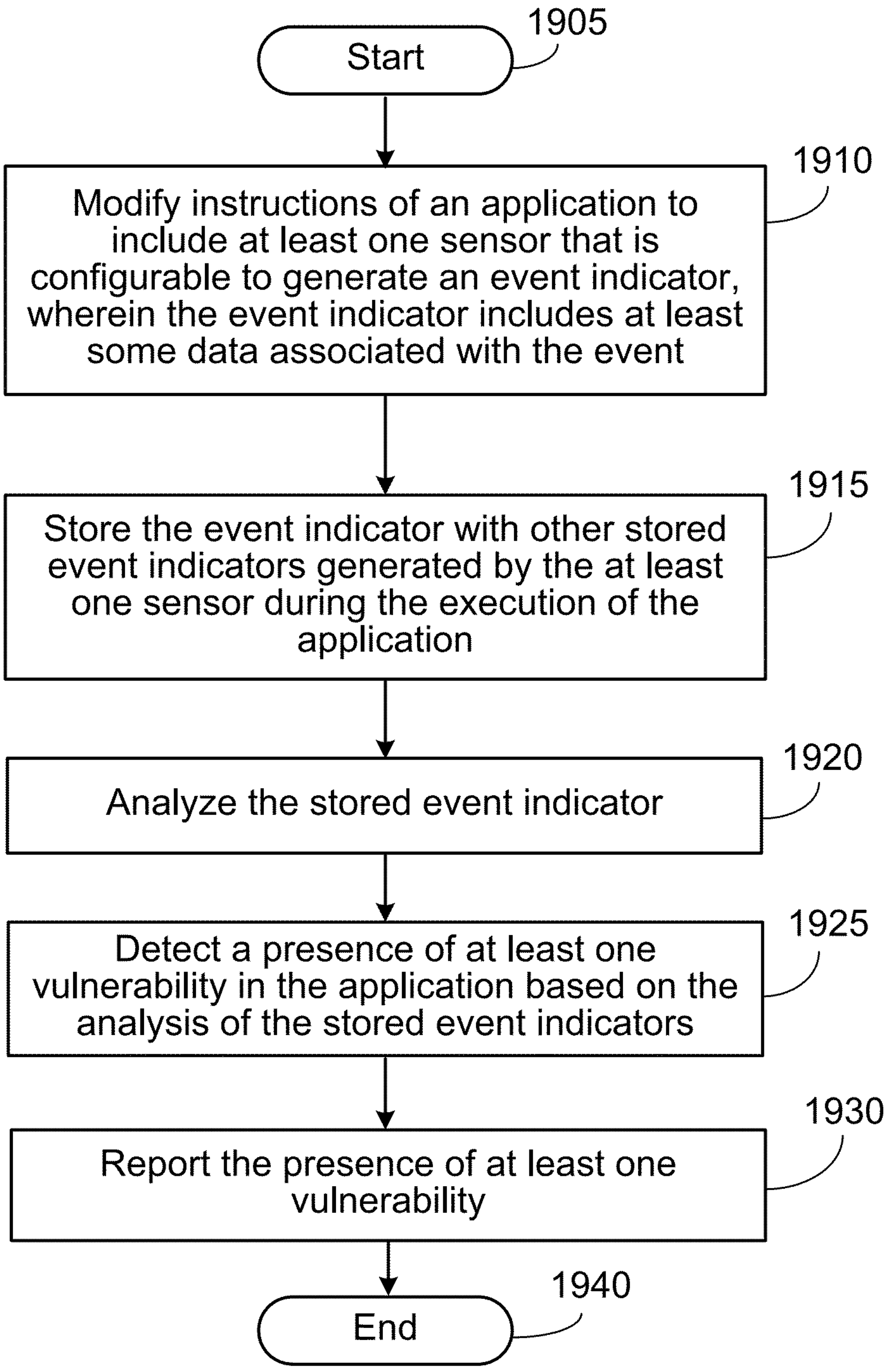
FIG. 19 is a flowchart of steps executed in accordance with implementations of the present disclosure.

Referring now to FIG. 19, example steps that can be executed in accordance with implementations of the present disclosure will be described. The example steps of FIG. 19 starting from step 1905 and ending at step 1940 can be executed using one or more processors coupled to a computer-readable storage medium at a computer system (e.g., the computer system 114 including server 102) and/or a client device (e.g., the client devices 108, 110).

In step 1910, instructions of the application are modified to include at least one sensor that is configurable to generate an indicator of an event, wherein the event indicator includes at least some data associated with the event. In step 1915, the event indicator is stored with the other stored event indicators generated by the at least one sensor during the execution of the application. In step 1920, the stored the event indicators are analyzed. In step 1925, a presence of at least one vulnerability in the application is detected based on the analysis of the stored event indicators. In step 1930, the presence of at least one vulnerability is reported.

The vulnerability detection system 200 can be used in a variety of different environments and/or for different purposes. For example, an analyst can run the application 230 with the vulnerability detection system 200 to find out whether it contains vulnerabilities. The analyst may be able to run the application 230 without requiring a special setup, environment or source code. The resulting output of vulnerability detection system 200 would include metrics on the security mechanisms present and also identifications of any vulnerabilities.

In another example, a developer without security knowledge can run the application 230 with the vulnerability detection system 200 enabled, perhaps only focused on their particular code. In this example, the vulnerability detection system 200 would be accessible directly from the developer's integrated development environment (IDE) and would produce warnings about detected vulnerabilities in the developer's code. Identified vulnerabilities would be displayed in the developer's IDE with suggested fixes. In addition, a profiling tool can integrate with the vulnerability detection system 200 to discover vulnerabilities during software development. Any vulnerability discovered would be logged as part of the testing results.

In yet another example, a software tester without security knowledge may be able to run the application 230 with the vulnerability detection system 200 to identify vulnerabilities and report them back to developers as bugs. The tester can use the GUI of the vulnerability detection system 200 to review and then submit the bugs for remediation into a bug-tracking system. When the vulnerabilities stop showing up in the application code, they are closed and bug metrics are tracked.

And in yet another example, a security expert may be able to add custom sensors and security rules to the vulnerability detection system 200, thus tailoring the vulnerability detection system's engine to the types of vulnerabilities that are specific to the organization's internal framework. The expert can use the vulnerability detection system 200 to gather information about what happens within the application 230 during a live penetration test. For example, the vulnerability detection system 200 can gather all the information related to encryption, or LDAP, or any other technology from the application 230.

In another example, application server software can use vulnerability detection system 200 to passively detect vulnerabilities in the application 230. A management console would keep track of the vulnerabilities discovered for later review by a system administrator.

In one implementation, vulnerability detection system 200 can be integrated with existing static and dynamic tools. The static tools are used to explore the application 230 to generate areas to explore. The dynamic tools are used exercise the API to generate coverage of the API. The vulnerability detection system 200 can then be used from inside the application 230 to see if any of the security attacks actually worked. Using static and dynamic tools together allows custom security rules to be evolved more quickly, thus improving the accuracy of the scans by vulnerability detection system 200. For example, by correlating dynamic scan results with execution path information gathered from the vulnerability detection system 200, a great deal of unnecessary scanning could be prevented. The vulnerability detection system 200 may also be able to provide information about the type of input required to pass certain validation or logic steps within the application 230.

In another exemplarily implementation, vulnerability detection system 200 can be used for gluing together static analysis traces with dynamic scanner traces, because the vulnerability detection system 200 can have the full runtime information along with the location of the problem in the code of the application 230. This can lead to even fuller, richer findings of vulnerabilities. The static analysis tool can also indicate the use of important security-related methods in the code that the vulnerability detection system 200 should instrument.

In some implementations, the vulnerability detection system 200 can be used to help with confirmation process for applications sold or distributed from an application store. Such an application store may be any web accessible site where a variety of software applications are available to users for activation or download. Examples of applications can include video game programs, personal information management programs, programs for playing media assets and/or navigating the media asset database, programs for controlling a telephone interface to place and/or receive calls, and so on. These applications are often first developed by third parties and then uploaded to the application store, where they can be downloaded by the users of the store. However, before allowing third party applications to be sold from the store, the store's operator may desire to enforce certain security requirements for the third party software to ensure that it conforms with the store's policies, license agreements, and does not include security vulnerabilities. The application store operator can rely on the testing performed by the vulnerability detection system 200 as part of the confirmation process for the newly developed applications before they are uploaded to the store. For example, the application store operator may require a new application to be tested by the vulnerability detection system 200 to determine whether the new application includes any problematic vulnerabilities. The new application is only uploaded to the store if it passes various vulnerability tests required by the operator and administered by the vulnerability detection system 200. The testing of the new applications can be performed directly by the application store operator or by the third party operating the vulnerability detection system 200. As part of testing, the vulnerability detection system 200 can be used to test whether the new application includes security vulnerabilities, whether it safely operates with other applications from the store, and/or whether it complies with the store's policies and license agreements. Furthermore, in some implementations, application retailers can work together with the vulnerability detection system to enable their applications to report vulnerabilities back to them when their application is being used by actual customers. For example, an application developer can develop an application that communicates with the vulnerability detection system during its execution to detect or report vulnerabilities. In addition or alternatively, the application developer can instrument the application with the help of the vulnerability detection system and then distribute the instrumented application to users. When users execute the instrumented application, it reports vulnerabilities or issues to the application developer. This reporting allows application developer to take advantage of all the different customers, systems, devices, configurations, and ways of using the application to improve the quality of application's security testing.

Figure 20:
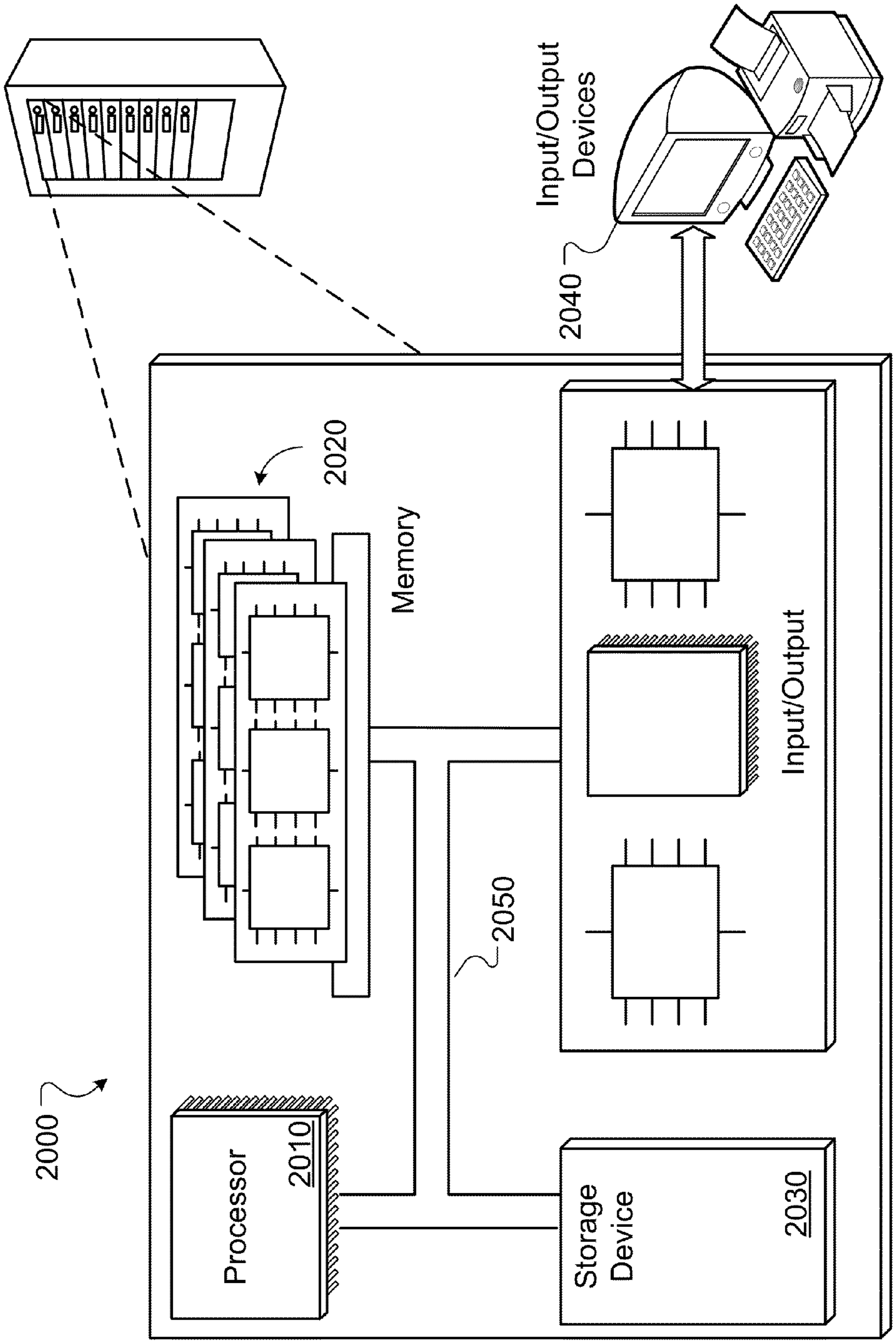
FIG. 20 is a schematic illustration of hardware components executing implementations of the present disclosure.

Referring now to FIG. 20, a schematic illustration of example hardware components that can be used to execute implementations of the present disclosure is provided. The system 2000 can be used for the operations described in association with the methods described in accordance with implementations of the present disclosure. For example, the system 2000 can be included in the application server 102 executing the vulnerability detection system 200. The system 2000 includes a processor 2010, a memory 2020, a storage device 2030, and an input/output device 2040. Each of the components 2010, 2020, 2030, and 2040 are interconnected using a system bus 2050. The processor 2010 is capable of processing instructions for execution within the system 2000. In one implementation, the processor 2010 is a single-threaded processor. In another implementation, the processor 2010 is a multi-threaded processor. The processor 2010 is capable of processing instructions stored in the memory 2020 or on the storage device 2030 to display graphical information for a user interface on the input/output device 2040.

The memory 2020 stores information within the system 2000. In one implementation, the memory 2020 is a computer-readable medium. In one implementation, the memory 2020 is a volatile memory unit. In another implementation, the memory 2020 is a non-volatile memory unit. Memory 1520 stores data, which typically comprises security rules, instructions, algorithms, code, or any other directives operable to enable the system to detect vulnerabilities. Stored data can be any suitable format such as, for example, an XML document, a flat file, CSV file, a name-value pair file, an SQL table, an HTML page, a text message, or others. In addition, data can include instructions written in or based on any appropriate computer language including C, C++, Java, Visual Basic, Perl, and others.

The storage device 2030 is capable of providing mass storage for the system 2000. In one implementation, the storage device 2030 is a computer-readable medium. In various different implementations, the storage device 2030 can be a floppy disk device, a hard disk device, an optical disk device, or a tape device. The input/output device 2040 provides input/output operations for the system 2000. In one implementation, the input/output device 2040 includes a keyboard and/or pointing device. In another implementation, the input/output device 2040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet. In addition, the vulnerability detection system can also operate in a hosted computing system, often referenced as "the cloud." The vulnerability detection system can be stored and executed from a server system, rather than from a client device, thus allowing the vulnerability detection system to be shared easily between users. In addition, the vulnerability detection system can also be implemented to operate with wireless handheld and/or specialized devices. The computer system can include clients and servers. A client and server are generally remote from each other and typically interact through a network, such as the described one. The relationship of client and server arises by virtue of computer programs running on the respective computers and having a client-server relationship to each other. However, one skilled in the art would recognize that any application, whether it embedded, mobile, desktop, server, or cloud, could use the described technology to detect vulnerabilities. Accordingly, one can use the described detection technology to monitor the running application and get notifications when the application violates the established policies.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of implementations of the present disclosure have been described. Nevertheless, it will be understood that various modifications can be made without departing from the spirit and scope of the present disclosure. Accordingly, other implementations are within the scope of the following claims.

What is claimed is:

1. A method for detecting a presence of at least one vulnerability in an application, the method comprising:

modifying instructions of the application to include at least one monitor adapted to generate an action snapshot of an action performed by the application when executed by one or more processors, wherein the action snapshot includes at least some data associated with the action;

storing the action snapshot with other stored action snapshots generated by the at least one monitor during the execution of the application when respective actions were performed by the application;

analyzing, from within the application and while the application is running, the stored action snapshots;

detecting the presence of at least one vulnerability in the application based on the analysis of the stored action snapshots, each of the at least one vulnerability is a pattern of application execution that is subject to abuse by a user of the application when the application is being executed by the same one or more processors; and reporting the presence of at least one vulnerability in the application as detected based on the analysis of the stored action snapshots.

2. The method of claim 1, further comprising: reducing the performance impact of monitoring by configuring the at least one monitor in such a way that application execution paths are monitored the first time they are executed but not each time they are executed thereafter.

3. The method of claim 1, further comprising: caching the modified instructions of the application in such a way that the at least one monitor can be applied more quickly to the application than other monitors.

4. The method of claim 1, wherein the modifying the instructions of the application snapshots further includes at least one monitor adapted to generate an action snapshot of an action selected based on the action snapshots generated by other monitors.

5. The method of claim 1, wherein the analyzing the at least one action snapshot further comprises: tracking properties of the data in the at least one action snapshot using at least one tag assigned to at least one part of said data.

6. The method of claim 1, wherein the analyzing the stored application snapshots further comprises: analyzing stored application snapshots generated from more than one application.

7. The method of claim 1 wherein the analyzing the stored application snapshots further comprises: identifying previously identified vulnerabilities that share execution paths with at least one action snapshot to determine if said vulnerabilities are no longer present in the application.

8. The method of claim 1, wherein the detecting the presence of at least one vulnerability further comprises: detecting the presence of at least one publically known vulnerability in a component used in the application.

9. The method of claim 1, wherein the at least one monitor is adapted to create action snapshots based on the data in HTTP requests and responses that are either received or transmitted by the running application.

10. The method of claim 1, wherein the at least one monitor is adapted to create action snapshots based on configuration information for the application.

11. The method of claim 1, wherein the at least one monitor is adapted to create action snapshots containing source code or decompiled binary code for the running application.

12. The method of claim 1, wherein the modifying the instructions of the application snapshots further includes at least one monitor adapted to generate an action snapshot of an action selected by testing and analyzing the runtime behavior of a run-time library or run time component.

13. The method of claim 1, further comprising: generating a visual representation of the security architecture of the application based on the analysis of stored action snapshots.

14. The method of claim 1, wherein the reporting the presence of at least one vulnerability further includes: reporting the execution paths in the application that have and have not been executed, thus revealing which portions of code have not been monitored for vulnerabilities.

15. The method of claim 1, wherein the reporting the presence of at least one vulnerability further includes reporting a web application firewall rule designed to remediate said vulnerability.

16. The method of claim 1, wherein the reporting the presence of at least one injection vulnerability further includes: reporting the appropriate encoding scheme to remediate said injection vulnerability based on the contextual data in at least one action snapshot.

17. The method of claim 1, wherein the reporting the presence of at least one vulnerability further includes: reporting remediation advice tailored to the specific application on the basis of other action snapshots.

18. The method of claim 1, wherein the reporting the presence of at least one vulnerability further includes reporting a code required to patch a vulnerability.

19. The method of claim 1, wherein the modifying the instructions of the application further comprises: dynamically patching a code segment at a run-time of the application.

20. The method of claim 19, wherein the code segment to be patched is a software component or library that is a part of the application.

* * * * *